United States Patent
Dai et al.

(10) Patent No.: US 10,059,625 B2
(45) Date of Patent: Aug. 28, 2018

(54) ENGINEERED HIGH EXPANSION GLASS-CERAMICS HAVING NEAR LINEAR THERMAL STRAIN AND METHODS THEREOF

(71) Applicant: National Technology & Engineering Solutions of Sandia, LLC, Albuquerque, NM (US)

(72) Inventors: Steve Xunhu Dai, Albuquerque, NM (US); Mark A. Rodriguez, Albuquerque, NM (US); Nathanael L. Lyon, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/701,893

(22) Filed: Sep. 12, 2017

(65) Prior Publication Data

US 2018/0002227 A1  Jan. 4, 2018

Related U.S. Application Data

(62) Division of application No. 14/834,616, filed on Aug. 25, 2015, now Pat. No. 9,878,944.

(51) Int. Cl.
| | |
|---|---|
| C03C 27/02 | (2006.01) |
| C03B 27/012 | (2006.01) |
| C03C 10/14 | (2006.01) |
| C03C 10/12 | (2006.01) |
| C03C 10/00 | (2006.01) |
| F16J 15/10 | (2006.01) |

(52) U.S. Cl.
CPC ............ *C03C 27/02* (2013.01); *C03B 27/012* (2013.01); *C03C 10/0027* (2013.01); *F16J 15/102* (2013.01)

(58) Field of Classification Search
CPC ..... C03C 10/09; C03C 10/0027; C03B 32/02; C03B 27/012
See application file for complete search history.

(56) References Cited

U.S. PATENT DOCUMENTS

| | | |
|---|---|---|
| 4,414,282 A | 11/1983 | McCollister et al. |
| 4,536,203 A | 8/1985 | Kramer |
| 4,705,585 A | 11/1987 | Kelly et al. |
| 4,921,738 A | 5/1990 | Cassidy |
| 5,104,738 A | 4/1992 | Brow et al. |
| 5,648,302 A | 7/1997 | Brow et al. |

(Continued)

OTHER PUBLICATIONS

Hammetter, W. F. et al., "Crystallization Kinetics of a Complex Lithium Silicate Glass-Ceramic", Journal of the American Ceramic Society, 1987, pp. 577-582, vol. 70, No. 8.

(Continued)

*Primary Examiner* — Karl E Group
(74) *Attorney, Agent, or Firm* — Helen S. Baca

(57) ABSTRACT

The present invention relates to glass-ceramic compositions, as well as methods for forming such composition. In particular, the compositions include various polymorphs of silica that provide beneficial thermal expansion characteristics (e.g., a near linear thermal strain). Also described are methods of forming such compositions, as well as connectors including hermetic seals containing such compositions.

20 Claims, 11 Drawing Sheets

(56) References Cited

U.S. PATENT DOCUMENTS

| | | | |
|---|---|---|---|
| 5,693,580 | A | 12/1997 | Brow et al. |
| 5,820,989 | A | 10/1998 | Reed et al. |
| 6,034,011 | A | 3/2000 | Yamaguchi et al. |
| 6,174,827 | B1 | 1/2001 | Goto et al. |
| 6,395,368 | B1 | 5/2002 | Yamaguchi et al. |
| 6,413,890 | B1 | 7/2002 | Goto |
| 8,082,663 | B1 | 12/2011 | Monroe et al. |
| 8,334,421 | B1 | 12/2012 | Gao et al. |
| 8,593,237 | B1 | 11/2013 | Dai |
| 8,772,566 | B2 | 7/2014 | Gao et al. |
| 9,878,944 | B1 * | 1/2018 | Dai ................... C03C 27/02 |

OTHER PUBLICATIONS

Henderson, W. R. et al., "Determination of the Optimum Crystallization Conditions of a High Thermal Expansion Glass-Ceramic", MOUND Report No. MLM-3136, Monsanto Research Corp., 1984, pp. 1-11.

Loehman, R. E. et al., "Design of High Thermal Expansion Glass-Ceramics through Microstructural Control", Ceramic Microstructures '86 (Materials Science Research, eds. J. A. Pask and A. G. Evans, New York and London: Plenum Press), 1987, pp. 33-43, vol. 21.

Bauleke, M. P., "How to Solve the Problems of Body Cracking and Glaze Popping in Stoneware Bodies", Kansas Geological Survey, 1978, Bulletin 211, Part 4, pp. 23-27.

Hummel, F. A., "Thermal Expansion Properties of Some Synthetic Lithia Minerals", Journal of American Ceramic Society, 1951, pp. 235-239, vol. 34.

Headley, T. J. et al., "Crystallization of a Glass-Ceramic by Epitaxial Growth", Journal of the American Ceramic Society, 1984, pp. 620-625, vol. 67.

\* cited by examiner

ENGINEERED HIGH EXPANSION GLASS-CERAMICS HAVING NEAR LINEAR THERMAL STRAIN AND METHODS THEREOF

CROSS-REFERENCE TO RELATED APPLICATION

This application is a divisional of prior application Ser. No. 14/834,616, filed Aug. 25, 2015, now U.S. Pat. No. 9,878,944, which is incorporated herewith by reference in its entirety.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to glass-ceramic compositions, as well as methods for forming such composition. In particular, the compositions include various polymorphs of silica that provide beneficial thermal expansion characteristics (e.g., a near linear thermal strain).

BACKGROUND OF THE INVENTION

Hermetic seals to metals are difficult to maintain under various operating conditions, such as changes in temperature. One approach to form matched seals in metals having a high coefficient of thermal expansion (CTE), for example stainless steel (SS), is the use of high CTE glass-ceramics (GCs). However, mismatches in thermal expansion characteristics can result in unsealing between such metal and GC interfaces in a seal. Additional compositions and methods are needed to provide GC compositions that more accurately match the thermal characteristics of metals.

SUMMARY OF THE INVENTION

The present invention relates to improved glass-ceramic (GC) compositions, as well as methods for forming such composition. In particular, the GC composition exhibits high CTE and a near linear thermal strain.

In one aspect, the invention features a glass-ceramic composition including: from about 65 wt. % to about 80 wt. % of $SiO_2$ (e.g., from 70 wt. % to 80 wt. %); from about 8 wt. % to about 16 wt. % of $Li_2O$ (e.g., from 12 wt. % to 14 wt. %); from about 2 wt. % to about 8 wt. % of $Al_2O_3$ (e.g., from 3 wt. % to 4.5 wt. %); from about 1 wt. % to about 8 wt. % of $K_2O$ (e.g., from 1.5 wt. % to 4 wt. %); from about 1 wt. % to about 5 wt. % of $P_2O_5$ (e.g., from 2.5 wt. % to 3.5 wt. %); from about 0.5 wt. % to about 7 wt. % of $B_2O_3$ (e.g., from 0.7 wt. % to 2.5 wt. %); and from about 0.1 wt. % to about 5 wt. % of ZnO (e.g., from 0.1 wt. % to 3 wt. %, such as 1 wt. % to 3 wt. %).

In any embodiment herein, the composition further includes of from about 5 wt. % to about 30 wt. % of $SiO_2$ as a cristobalite phase (e.g., from 5 wt. % to 10 wt. %, 5 wt. % to 15 wt. %, 5 wt. % to 20 wt. %, 5 wt. % to 25 wt. %, 10 wt. % to 15 wt. %, 10 wt. % to 20 wt. %, 10 wt. % to 25 wt. %, 10 wt. % to 30 wt. %, 15 wt. % to 20 wt. %, 15 wt. % to 25 wt. %, 15 wt. % to 30 wt. %, 20 wt. % to 25 wt. %, 20 wt. % to 30 wt. %, and 25 wt. % to 30 wt. %).

In any embodiment herein, the composition further includes of from about 5 wt. % to about 30 wt. % of $SiO_2$ as a quartz phase (e.g., from 5 wt. % to 10 wt. %, 5 wt. % to 15 wt. %, 5 wt. % to 20 wt. %, 5 wt. % to 25 wt. %, 10 wt. % to 15 wt. %, 10 wt. % to 20 wt. %, 10 wt. % to 25 wt. %, 10 wt. % to 30 wt. %, 15 wt. % to 20 wt. %, 15 wt. % to 25 wt. %, 15 wt. % to 30 wt. %, 20 wt. % to 25 wt. %, 20 wt. % to 30 wt. %, and 25 wt. % to 30 wt. %).

In any embodiment herein, the ratio, by weight, of the cristobalite phase to the quartz phase (e.g., in the GC composition) is of from about 1:0.5 to about 1:2 (e.g., from 1:0.6 to 1:2, 1:0.7 to 1:2, 1:0.8 to 1:2, 1:0.9 to 1:2, 1:1 to 1:2, 1:1.1 to 1:2, 1:1.2 to 1:2, 1:1.3 to 1:2, 1:1.4 to 1:2, 1:1.5 to 1:2, 1:1.6 to 1:2, 1:1.7 to 1:2, 1:1.8 to 1:2, or 1:1.9 to 1:2)

In any embodiment herein, the quartz phase includes α-quartz and/or β-quartz. In other embodiments, the cristobalite phase includes α-cristobalite and/or β-cristobalite.

In any embodiment herein, a combined weight percentage for both the cristobalite phase and the quartz phase (e.g., in the GC composition) is of from about 10 wt. % to about 50 wt. % (e.g., from 10 wt. % to 15 wt. %, 10 wt. % to 20 wt. %, 10 wt. % to 25 wt. %, 10 wt. % to 30 wt. %, 10 wt. % to 35 wt. %, 10 wt. % to 40 wt. %, 10 wt. % to 45 wt. %, 15 wt. % to 20 wt. %, 15 wt. % to 25 wt. %, 15 wt. % to 30 wt. %, 15 wt. % to 35 wt. %, 15 wt. % to 40 wt. %, 15 wt. % to 45 wt. %, 15 wt. % to 50 wt. %, 20 wt. % to 25 wt. %, 20 wt. % to 30 wt. %, 20 wt. % to 35 wt. %, 20 wt. % to 40 wt. %, 20 wt. % to 45 wt. %, 20 wt. % to 50 wt. %, 25 wt. % to 30 wt. %, 25 wt. % to 35 wt. %, 25 wt. % to 40 wt. %, 25 wt. % to 45 wt. %, 25 wt. % to 50 wt. %, 30 wt. % to 35 wt. %, 30 wt. % to 40 wt. %, 30 wt. % to 45 wt. %, 30 wt. % to 50 wt. %, 35 wt. % to 40 wt. %, 35 wt. % to 45 wt. %, 35 wt. % to 50 wt. %, 40 wt. % to 45 wt. %, 40 wt. % to 50 wt. %, and 45 wt. % to 50 wt. %).

In any embodiment herein, the composition further includes of from about wt. % to about 30 wt. % of $SiO_2$ as an amorphous phase (e.g., from 5 wt. % to 10 wt. %, 5 wt. % to 15 wt. %, 5 wt. % to 20 wt. %, 5 wt. % to 25 wt. %, 10 wt. % to 15 wt. %, 10 wt. % to 20 wt. %, 10 wt. % to 25 wt. %, 10 wt. % to 30 wt. %, 15 wt. % to 20 wt. %, 15 wt. % to 25 wt. %, 15 wt. % to 30 wt. %, 20 wt. % to 25 wt. %, 20 wt. % to 30 wt. %, and 25 wt. % to 30 wt. %).

In any embodiment herein, the composition further includes a near linear thermal strain, where the $R^2$ value of a linear fit to thermal strain data is greater than 0.99.

In any embodiment herein, the composition is provided as a glass-ceramic preform. In other embodiments, the composition is provided as a glass-ceramic seal.

In another aspect, the invention features a method including: providing a glass-ceramic (GC) mixture; heating the mixture to a first temperature $T_1$ (e.g., of from about 900° C. to about 1050° C.); rapidly cooling at a rate $r_2$ greater than about 30° C./minute to a second temperature $T_2$ (e.g., of from about 400° C. to about 800° C.), thereby minimizing formation of a cristobalite $SiO_2$ phase within the mixture; reheating the mixture to a third temperature $T_3$ (e.g., of from about 750° C. to about 850° C.), thereby facilitating formation of a quartz $SiO_2$ phase within the mixture; and cooling the mixture to a fourth temperature $T_4$ (e.g., of from about 10° C. to about 500° C.), thereby forming a glass-ceramic (GC) composition.

Temperatures $T_1$, $T_2$, $T_3$, and $T_4$ can be any useful temperature or temperature range. In some embodiments, temperature $T_1$ is of from about 900° C. to about 1500° C. (e.g., of from 900° C. to 1250° C., from 900° C. to 1200° C., from 900° C. to 1100° C., from 900° C. to 1050° C., from 900° C. to 1000° C., from 925° C. to 1500° C., from 925°

C. to 1250° C., from 925° C. to 1200° C., from 925° C. to 1100° C., from 925° C. to 1050° C., from 925° C. to 1000° C., from 950° C. to 1500° C., from 950° C. to 1250° C., from 950° C. to 1200° C., from 950° C. to 1100° C., from 950° C. to 1050° C., from 950° C. to 1000° C., from 1000° C. to 1500° C., from 1000° C. to 1250° C., from 1000° C. to 1200° C., from 1000° C. to 1100° C., from 1000° C. to 1050° C., or from 1000° C. to 1000° C.).

In other embodiments, temperature $T_2$ is of from about 300° C. to about 900° C. (e.g., of from 300° C. to 850° C., from 300° C. to 800° C., from 300° C. to 750° C., from 300° C. to 700° C., 300° C. to 650° C., 300° C. to 600° C., from 350° C. to 900° C., from 350° C. to 850° C., from 350° C. to 800° C., from 350° C. to 750° C., from 350° C. to 700° C., 350° C. to 650° C., 350° C. to 600° C., from 375° C. to 900° C., 375° C. to 850° C., from 375° C. to 800° C., from 375° C. to 750° C., from 375° C. to 700° C., 375° C. to 650° C., 375° C. to 600° C., from 400° C. to 900° C., 400° C. to 850° C., from 400° C. to 800° C., from 400° C. to 750° C., from 400° C. to 700° C., 400° C. to 650° C., 400° C. to 600° C., from 450° C. to 900° C., 450° C. to 850° C., from 450° C. to 800° C., from 450° C. to 750° C., from 450° C. to 700° C., 450° C. to 650° C., 450° C. to 600° C., from 475° C. to 900° C., 475° C. to 850° C., from 475° C. to 800° C., from 475° C. to 750° C., from 475° C. to 700° C., 475° C. to 650° C., 475° C. to 600° C., from 500° C. to 900° C., 500° C. to 850° C., from 500° C. to 800° C., from 500° C. to 750° C., from 500° C. to 700° C., 500° C. to 650° C., or 500° C. to 600° C.).

In yet other embodiments, temperature $T_3$ is of from about 650° C. to about 950° C. (e.g., of from 650° C. to 900° C., from 650° C. to 850° C., from 650° C. to 800° C., from 650° C. to 750° C., from 650° C. to 700° C., from 700° C. to 950° C., from 700° C. to 900° C., from 700° C. to 850° C., from 700° C. to 800° C., from 700° C. to 750° C., from 750° C. to 950° C., from 750° C. to 900° C., from 750° C. to 850° C., from 750° C. to 800° C., from 775° C. to 950° C., from 775° C. to 900° C., from 775° C. to 850° C., from 775° C. to 800° C., from 800° C. to 950° C., from 800° C. to 900° C., from 800° C. to 850° C., from 825° C. to 950° C., from 825° C. to 900° C., from 825° C. to 850° C., from 850° C. to 950° C., from 850° C. to 900° C., from 875° C. to 950° C., or from 875° C. to 900° C.).

In some embodiments, temperature $T_4$ is of from about 5° C. to about 500° C. (e.g., of from 5° C. to 450° C., from 5° C. to 400° C., from 5° C. to 350° C., from 5° C. to 300° C., from 5° C. to 250° C., from 5° C. to 200° C., from 5° C. to 150° C., from 5° C. to 100° C., from 5° C. to 50° C., from 10° C. to 500° C., from 10° C. to 450° C., from 10° C. to 400° C., from 10° C. to 350° C., from 10° C. to 300° C., from 10° C. to 250° C., from 10° C. to 200° C., from 10° C. to 150° C., from 10° C. to 100° C., from 10° C. to 50° C., from 15° C. to 500° C., from 15° C. to 450° C., from 15° C. to 400° C., from 15° C. to 350° C., from 15° C. to 300° C., from 15° C. to 250° C., from 15° C. to 200° C., from 15° C. to 150° C., from 15° C. to 100° C., from 15° C. to 50° C., from 20° C. to 500° C., from 20° C. to 450° C., from 20° C. to 400° C., from 20° C. to 350° C., from 20° C. to 300° C., from 20° C. to 250° C., from 20° C. to 200° C., from 20° C. to 150° C., from 20° C. to 100° C., from 20° C. to 50° C., from 25° C. to 500° C., from 25° C. to 450° C., from 25° C. to 400° C., from 25° C. to 350° C., from 25° C. to 300° C., from 25° C. to 250° C., from 25° C. to 200° C., from 25° C. to 150° C., from 25° C. to 100° C., or from 25° C. to 50° C.).

In some embodiments, rate $r_2$ is greater than about 30° C./minute (e.g., of from about 30° C./minute to about 300° C./minute, such as from 35° C./minute to 300° C./minute, 35° C./minute to 250° C./minute, 35° C./minute to 200° C./minute, 35° C./minute to 100° C./minute, 35° C./minute to 90° C./minute, 35° C./minute to 80° C./minute, 40° C./minute to 300° C./minute, 40° C./minute to 250° C./minute, 40° C./minute to 200° C./minute, 40° C./minute to 150° C./minute, 40° C./minute to 100° C./minute, 40° C./minute to 90° C./minute, 40° C./minute to 80° C./minute, 50° C./minute to 300° C./minute, 50° C./minute to 250° C./minute, 50° C./minute to 200° C./minute, 50° C./minute to 150° C./minute, 50° C./minute to 100° C./minute, 50° C./minute to 90° C./minute, or 50° C./minute to 80° C./minute).

In one embodiment, the GC mixture is configured to provide a GC composition (e.g., a bubble-free composition) including of from about 65 wt. % to about 80 wt. % of $SiO_2$; from about 8 wt. % to about 16 wt. % of $Li_2O$; from about 2 wt. % to about 8 wt. % of $Al_2O_3$; from about 1 wt. % to about 8 wt. % of $K_2O$; from about 1 wt. % to about 5 wt. % of $P_2O_5$; from about 0.5 wt. % to about 7 wt. % of $B_2O_3$; and from about 0.1 wt. % to about 5 wt. % of ZnO.

In another embodiment, the GC mixture includes raw materials configured to provide components of the GC composition. In some embodiments, the GC mixture includes of from about 40 wt. % to about 90 wt. % of $SiO_2$ (e.g., from 50 wt. % to 80 wt. %); from about 10 wt. % to about 45 wt. % of $Li_2CO_3$ (e.g., from 10 wt. % to 30 wt. %); from about 1 wt. % to about 10 wt. % of $Al_2O_3$ (e.g., from 1 wt. % to 5 wt. %); from about 0.5 wt. % to about 15 wt. % of $K_2CO_3$ (e.g., from 2 wt. % to 10 wt. %); from about 0.5 wt. % to about 10 wt. % of $Li_3PO_4$ (e.g., from 2 wt. % to 10 wt. %); from about 0.5 wt. % to about 15 wt. % of $H_3BO_3$ (e.g., from 1 wt. % to 5 wt. %); and from about 0.05 wt. % to about 6 wt. % of ZnO (e.g., from 1 wt. % to 5 wt. %).

In some embodiments, the method further includes dwelling at the first temperature $T_1$ for a first period $P_1$ (e.g., configured to allow the mixture to flow and fill a cavity, such as for a seal, a bore, a mold, an insert, etc.). In particular embodiments, the first period $P_1$ is of from about 1 minute to about 30 minutes (e.g., of from about 1 minute to 20 minutes, 5 minutes to 20 minutes, or 5 minutes to 30 minutes).

In some embodiments, the method further includes dwelling at the second temperature $T_2$ for a second period $P_2$ (e.g., configured to facilitate formation of the quartz $SiO_2$ phase). In particular embodiments, the second period $P_2$ is of from about 1 minute to about 60 minutes (e.g., of from about 1 minute to 30 minutes, 1 minute to 45 minutes, 10 minutes to 30 minutes, 10 minutes to 45 minutes, 10 minutes to 60 minutes, 30 minutes to 45 minutes, or 30 minutes to 60 minutes).

In some embodiments, the method further includes dwelling at the third temperature $T_3$ for a third period $P_3$ (e.g., configured to facilitate formation of the cristobalite $SiO_2$ phase). In particular embodiments, the third period $P_3$ is of from about 1 minute to about 60 minutes (e.g., of from about 1 minute to 30 minutes, 1 minute to 45 minutes, 10 minutes to 30 minutes, 10 minutes to 45 minutes, 10 minutes to 60 minutes, 30 minutes to 45 minutes, or 30 minutes to 60 minutes).

In some embodiments, GC composition includes a glass-ceramic preform or a glass-ceramic seal.

In other embodiments, the heating step is conducted in the presence of a metal. In further embodiments, the GC composition forms a seal with the metal. In yet other embodiments, the metal is inserted into the cavity, and the GC mixture (or GC composition) is flowed into the cavity, thereby facilitating contact between the metal and the GC mixture (or GC composition).

In some embodiments, the providing step is conducted by providing the GC mixture within a cavity (e.g., a cavity within a casing). In further embodiments, the heating step includes inserting a metal component (e.g., a metal pin) within the cavity and heating the GC mixture, thereby allowing the GC mixture to flow into a space defined by the cavity and the metal component. In yet further embodiments, the cooling steps include forming a seal (e.g., a hermetic seal) between the GC composition and metal component (e.g., and the casing).

In yet another aspect, the invention features a hermetic seal (e.g., including any GC composition or GC mixture described herein). In one embodiment, the hermetic seal includes a metal component (e.g., any herein); and a GC composition (e.g., any herein) disposed on a surface of the metal component. In another embodiment, the hermetic seal further includes a casing, where the metal component is disposed within a cavity of the casing and the GC composition is further disposed on a surface defining the cavity. In yet another embodiment, the casing includes a plurality of cavities, and a metal component is disposed within each cavity. In further embodiments, a hermetic seal is formed within each cavity.

Definitions

As used herein, the term "about" means +/−10% of any recited value. As used herein, this term modifies any recited value, range of values, or endpoints of one or more ranges.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

DETAILED DESCRIPTION OF THE INVENTION

Figure 1A:
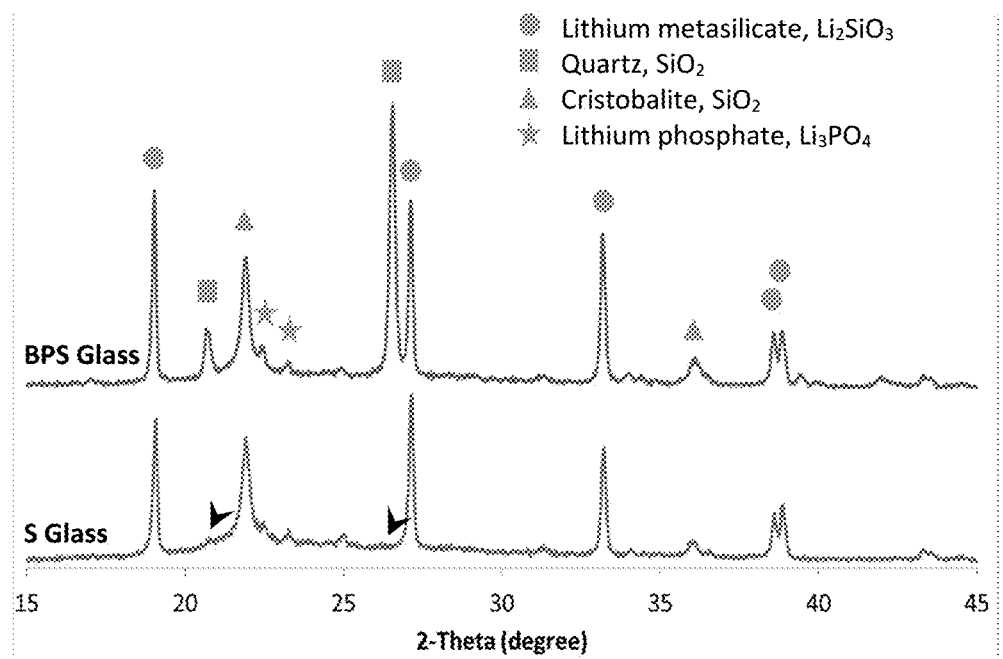
FIG. 1A-1B shows embodiments of the present invention. As seen in (A), XRD data show the difference between S glass (which does not contain ZnO) and BPS glass (which contains ZnO). In particular, S glass lacks the peaks characteristic of the quartz phase of silica (noted by black arrowheads). As seen in (B), BPS glass compositions can be treated to a thermal process that initially avoids cristobalite formation, promotes quartz formation, and then finally facilitates cristobalite formation.

The present invention relates to GC compositions having beneficial thermal properties, as well as methods for forming such compositions. S glass is a high CTE ceramic material that does not include ZnO (see, e.g., U.S. Pat. No. 4,414,282). Without wishing to be limited by mechanism, it is believed that ZnO is helpful in promoting the formation of quartz within the GC composition. As seen in FIG. 1A, the S glass lacks the characteristic peaks for quartz phase (indicated by arrowheads) or else the amount of quartz is very modest as compared to the cristobalite phase. In contrast, the GC compositions of the present invention have controlled amounts of the quartz and cristobalite phases. In particular embodiments, relatively significant amounts of both quartz and cristobalite phases are present in the GC composition (e.g., of from about 5 wt. % to about 30 wt. % of each of these phases). As seen in FIG. 1A, one exemplary GC composition (e.g., BPS glass, see, e.g., U.S. Pat. No. 5,820,989) includes characteristics peaks for quartz (noted by square markers).

Figure 5:
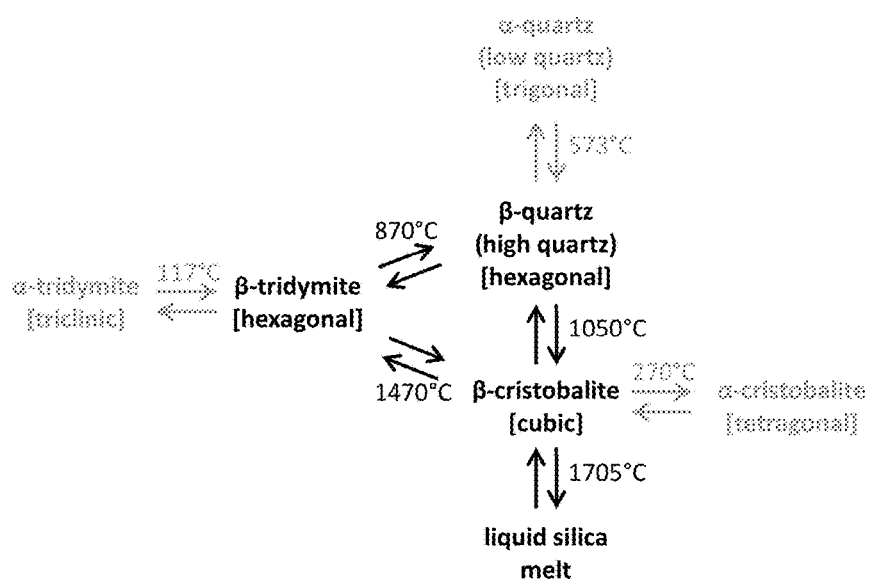
FIG. 5 shows a schematic showing the transformation of various polymorphs of silica (black text), as well as particular metastable forms (gray text).

The present invention also relates to methods that promote the formation of both quartz and cristobalite phases in a controlled manner. Controlling the formation of quartz and cristobalite can be a nuanced process, as both of these phases are polymorphs of the same chemical compound, $SiO_2$. These polymorphs preferentially exist at different temperatures, and different crystallization conditions are required to preferentially promote the growth of a particular phase. In addition, each phase can be metastable (e.g., quartz exists as both an α-form and a β-form, as seen in FIG. 5). The present invention describes such processes to control the growth of particular phases under certain experimental conditions.

Figure 1B:
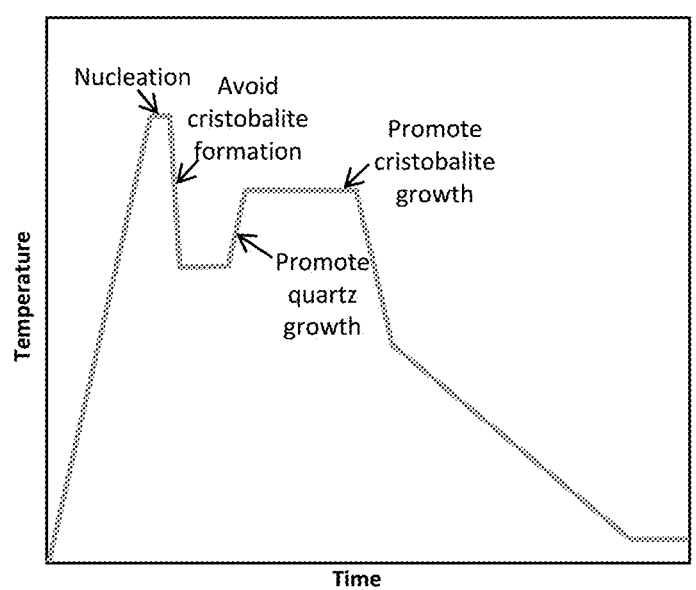

In one instance (FIG. 1B), the method includes an initial nucleation step (or sealing step) at a high temperature, a steep rate of cooling to avoid cristobalite formation, a rate of heating to promote quartz formation in favor of cristobalite formation, and then a dwelling period at a different temperature to promote cristobalite formation.

Figure 2A:
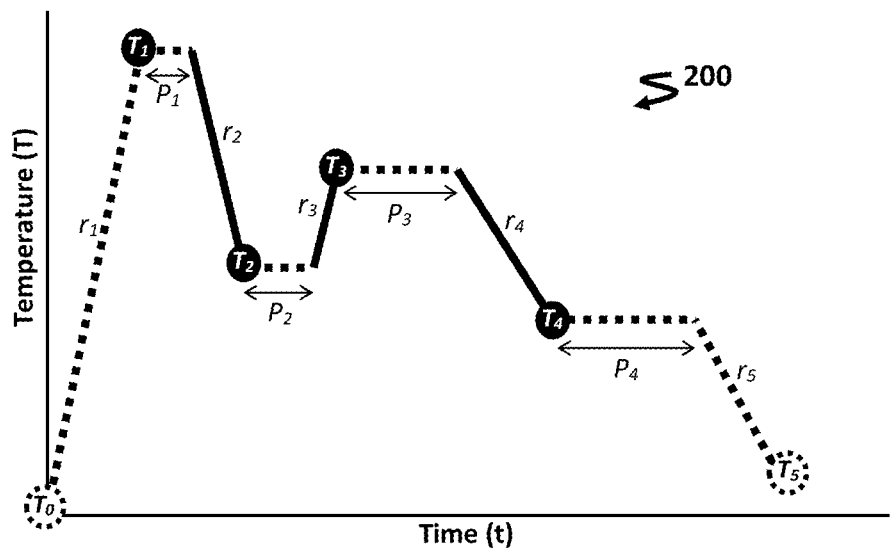
FIG. 2A-2C shows exemplary thermal processes including various temperatures $T_0$ to $T_5$, rates $r_1$ to $r_5$, and periods $P_1$ and $P_4$. Provided are (A,B) schematics of two exemplary processes 200, 250, where dashed lines indicate optional steps; and (C) a flowchart of an exemplary process 2000.
Figure 2B:
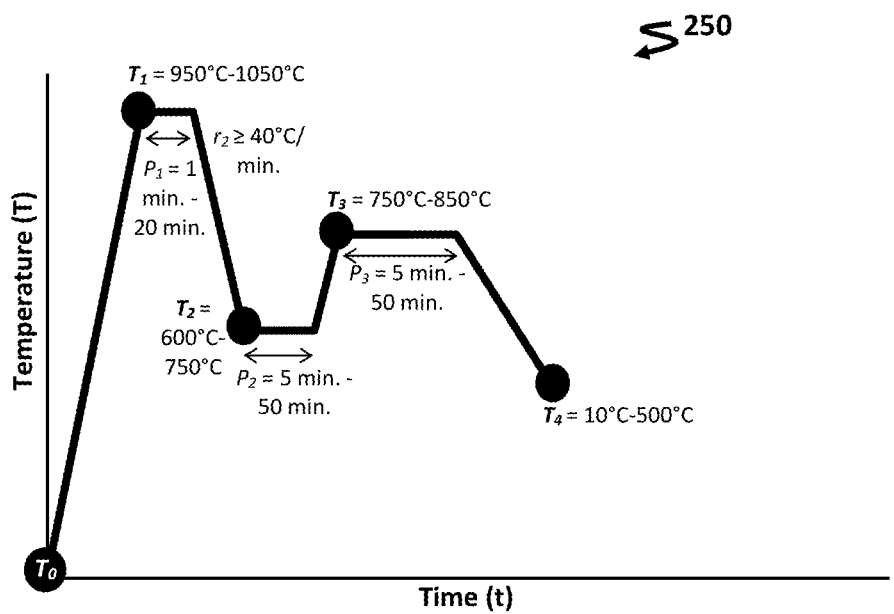
Figure 2C:
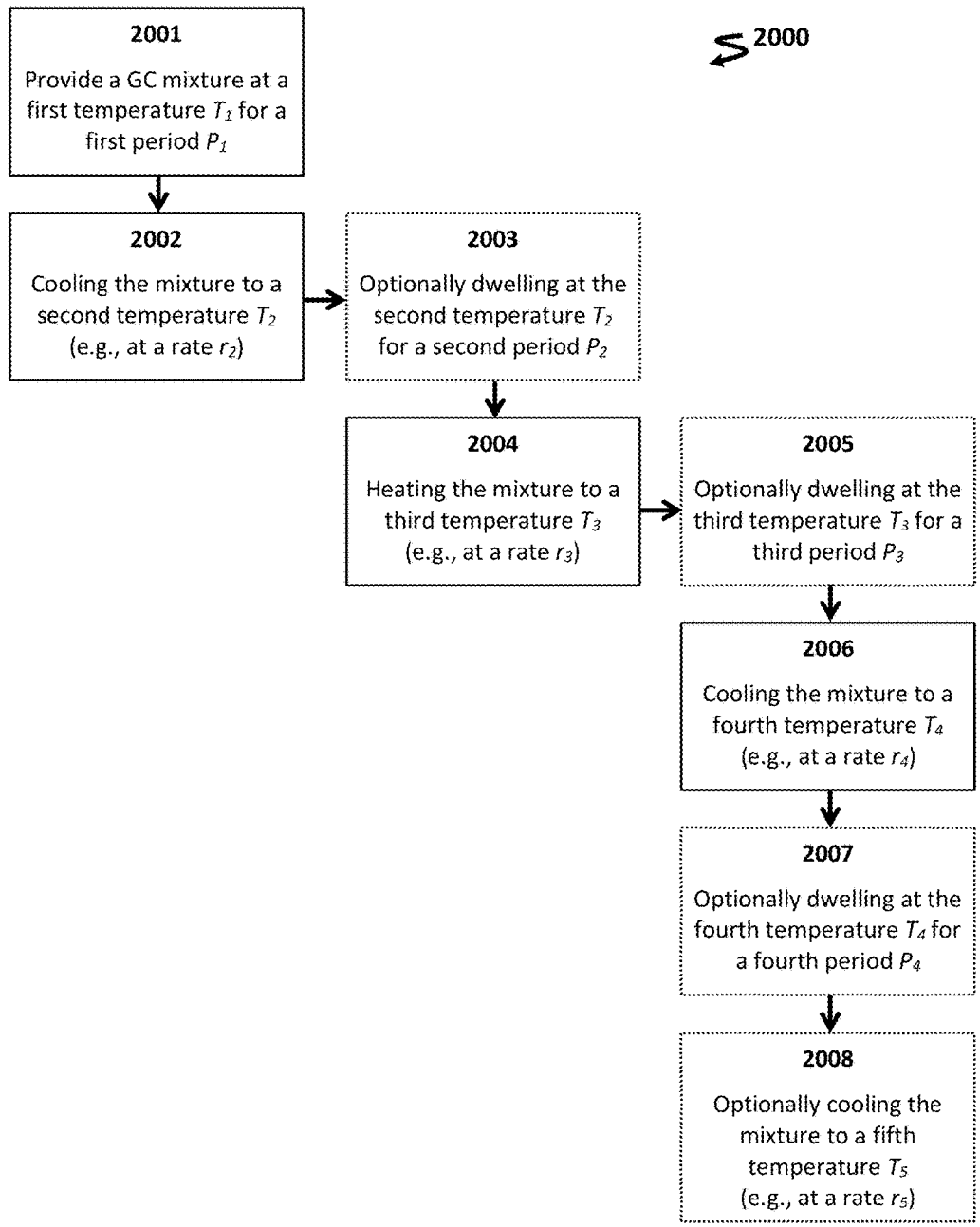

An embodiment of this method is provided in FIGS. 2A and 2C. As can be seen, the thermal process 200,2000 includes an initial temperature $T_0$ (e.g., of from about 10° C. to about 30° C.) at which a GC mixture is provided. Then, there is a heating step 2001 to a first temperature $T_1$ for a first period $P_1$ (e.g., at rate $r_4$). Next, there a cooling step 2002 to a second temperature $T_2$ (e.g., at a rate $r_2$). Optionally, the mixture is exposed to a dwelling step 2003 at the second temperature $T_2$ for a second period $P_2$ (e.g., to promote formation of the quartz phase). A heating step 2004 is conducted at a third temperature $T_3$ (e.g., at a rate $r_3$). This step 2004 can be useful, e.g., to promote formation of the cristobalite phase. Optionally, the mixture is exposed to another dwelling step 2005 at the third temperature $T_3$ for a third period $P_3$. Further cooling steps can be conducted after forming the quartz and cristobalite phases. In one instance, a cooling step 2006 to a fourth temperature $T_4$ (e.g., at a rate $r_4$) is conducted with an optional dwelling step 2007 at the fourth temperature $T_4$ for a fourth period $P_4$. In a further instance, an optional cooling step 2008 can be conducted at a fifth temperature $T_5$ (e.g., at a rate $r_5$).

The method can be performed with any useful temperatures, periods, and rates. For instance, as seen in FIG. 2B, the thermal process 250 includes a heating step to a first temperature $T_1$ (e.g., of from about 900° C. to about 1050° C., such as from 900° C. to 1000° C., from 950° C. to 1050° C., or from 950° C. to 1000° C.) for a period $P_1$ (e.g., of from about 1 minute to about 30 minutes). Then, a rapid cooling step is conducted with a rate $r_2$ greater than about 40° C./minute (e.g., of from about 50° C./minute to about 200° C./minute) to a second temperature $T_2$ (e.g., of from about 400° C. to about 800° C., such as from 400° C. to 750° C. or 600° C. to 750° C.) for a second period $P_2$ (e.g., of from about 1 minute to about 60 minutes). Next, a heating step is conducted to a third temperature $T_3$ (e.g., of from about 750° C. to about 850° C.) for a third period $P_3$ (e.g., of from about 1 minute to about 60 minutes, such as 5 minutes to 50 minutes, 30 minutes to 50 minutes, or 30 minutes to 60 minutes). Finally, the mixture is cooled to a fourth temperature $T_4$ (e.g., of from about 10° C. to about 500° C.). Other variations and modifications are described herein.

Glass-Ceramic Composition

The glass-ceramic material can be any useful composition. In one embodiment, the GC composition includes a final composition of $SiO_2$ (e.g., 65-80 wt. %), $Li_2O$ (e.g., 8-16 wt. %), $Al_2O_3$ (e.g., 2-8 wt. %), $P_2O_5$ (e.g., 1-5 wt. %), $K_2O$ (e.g., 1-8 wt. %), $B_2O_3$ (e.g., 0.5-7 wt. %), and ZnO (e.g., 0.1-5 wt. %). High-strength seals can also be made using 304 stainless steel as well as nitronic stainless steel in the metal housing or casing and other stainless steel alloys with the disclosed glass-ceramic of the present invention by belt processing. Additional materials are described in U.S. Pat. No. 5,820,989, which is incorporated herein by reference in its entirety.

The GC composition can be formed from raw materials that are functionally equivalent to the components present in the final composition. For instance, functionally equivalent raw materials include phosphates, carbonates, borates, lithium forms, etc. of any of the components described herein for the GC composition. In one example, the GC composition herein includes from about 8 wt. % to about 16 wt. % of $Li_2O$, which can be introduced as a raw material that is a carbonate form of the $Li_2O$ component (e.g., as a $Li_2CO_3$ raw material). Other raw materials include carbonate forms of $K_2O$ (e.g., $K_2CO_3$ raw materials); lithium forms of $P_2O_5$ (e.g., $Li_3PO_4$ raw materials); as well as borate forms of $B_2O_3$ (e.g., $H_3BO_3$ raw materials).

Applications

GC compositions can be used in numerous applications. For instance, GC-to-metal seals can be useful for electrical connections (e.g., in co-axial single pin or multiple-pin connectors, headers, as described in U.S. Pat. Nos. 4,414,282 and 8,082,663, which is incorporated herein by reference in its entirety). Electrical connectors with hermetic seals are used in aerospace applications, such as communications satellites, microwave communications equip, and military communications and radar systems; the automotive industry; and commercial communications.

GC-to-metal seals can include any useful metal. Exemplary metals include a conductive metal, stainless steel (e.g., 304L, 330, or 333 stainless steel), nitronic steel, palladium, gold, silver, copper, nickel, titanium, molybdenum, chrome, as well as alloys thereof (e.g., a silver-copper nickel alloy, a nickel-molybdenum chrome alloy (Hastelloy C-276, Inconel 625, or Inconel 718).

Such metals can be of any useful form, such as a pin, a housing, a casing, etc. In one embodiment, the metal pin is a commercially available pin, referred to as a Paliney® 7 pin, with the approximate composition of 34% Pd, 30% Ag, 10% Pt, 10% Au, 15% Cu, and less than 1% Zn. In another embodiment, the metal pin is a commercially available pin, referred to as a Paliney® 6 pin, with the approximate composition of 43-45% Pd, approximately 37-39% Ag, approximately 0.8-1.2% Pt, approximately 15-17% Cu, and less than or equal to 1.2% Ni. In one embodiment, these pins have a hardness of greater than or equal to 300 Knoop after heat treatment incorporated into the sealing cycle. The metal pin can also be comprised of 330 or 333 stainless steel.

EXAMPLES

Example 1: Sealing Glass-Ceramics with Near Linear Thermal Strain

A widely adopted approach to form matched seals in metals having a high coefficient of thermal expansion (CTE), for example stainless steel (SS), is the use of high CTE glass-ceramics (GCs). With nucleation of $Li_3PO_4$ followed by growth of cristobalite as the main high expansion crystalline phase, the CTE of re-crystallizable lithium silicate-based GCs (e.g., GCs including $Li_2O$—$SiO_2$—$Al_2O_3$—$K_2O$—$B_2O_3$—$P_2O_5$—ZnO) could approach 18 ppm/° C., matching closely to the 18~20 ppm/° C. CTE of 304L SS. However, a large volume change induced by the inversion between the low- and high-cristobalite phases, a 1st order α-β-phase transition, results in a nonlinear steplike change in the thermal strain of GCs. This sudden change in the GC thermal strain causes a substantial transient mismatch between the GC and SS.

Here, we developed new heat treatment schedules, based on the $SiO_2$ phase diagram, to crystallize both quartz and cristobalite as high expansion crystalline phases in the GCs. One particular thermal treatment schedule included rapid cooling of GC from the peak sealing temperature to avoid initial crystallization of cristobalite, followed by heating of the GC to a dwell temperature during which the quartz precipitates, and subsequent crystallization of cristobalite at the dwell temperature. Quantitative X-ray diffraction (XRD)

analysis of serial quenched GC samples clearly revealed the sequence of crystallization in the new thermal treatment schedule. The coexistence of two significantly reduced volume changes, one at ~220° C. from cristobalite inversion and the other at ~470° C. from quartz inversion, greatly improved the linearity of the thermal strains of the GCs, and is expected to improve the thermal match between GC and SS over the sealing cycle. Additional details follow.

Introduction

Lithium silicate GCs, usually modified with a small amount of other oxides (for example $K_2O$, $B_2O_3$, $Al_2O_3$, ZnO, etc., and often $P_2O_5$ as the high temperature nucleating agent) have been extensively used for sealing electrical feedthroughs in metal housings (see, e.g., Donald I W, "Glass-to-metal seals," Sheffield, UK: Society of Glass Technology, 2009). Glass-ceramic to metal (GCtM) seals combine the ease of conventional glass-to-metal (GtM) seals along with the performance often achieved in ceramic-to-metal (CtM) seals. In particular, the GCtM seals offer several distinct advantages: high temperature mechanical strength of the seals, high dielectric breakdown strength for greater electrical isolation, good hermeticity for environmental protection, and long-term reliability. These unique properties enable GCtM seals to be widely adopted in high performance components and systems that are often deployed into extreme environments, as well as high consequence and mission critical applications.

The major crystalline phases formed in the lithium silicate system are lithium silicate ($Li_2SiO_3$, designated as LS), lithium disilicate ($Li_2Si_2O_5$, designated as LS2) and silica ($SiO_2$) polymorphs, e.g., cristobalite, quartz. and tridymite. Bulk crystallization occurring in this system is nucleated by $Li_3PO_4$ (see, e.g., Hammetter W F et al., Crystallization kinetics of a complex lithium silicate glass-ceramic, *J. Am. Ceram. Soc.* 1987; 70(8):577-82). Upon heating, LS appears around 650° C. and then converts to LS2 around 850° C. by reaction with $SiO_2$ from the melt. Preheating the glass at 1000° C. dissolves the LS and LS2 crystals and forms heterogeneous $Li_3PO_4$ nuclei that promote crystallization of LS, LS2, and cristobalite on subsequent cooling of the melt. The crystallization occurs by epitaxial growth on favored facets of the $Li_3PO_4$ crystallites (see, e.g., Headley T J et al., Crystallization of a glass-ceramic by epitaxial growth, *J. Am. Ceram. Soc.* 1984; 67(9):620-5). Depending on the type as well as the amount of the crystallized phases, GCs with moderate to high CTE (e.g., about 10-18 ppm/° C.) can be produced (see, e.g., Henderson W R et al., "Determination of the optimum crystallization conditions of a high thermal expansion glass-ceramic," *MOUND Report No. MLM*-3136, Miamisburg, Ohio: Monsanto Research Corp., 1984, 11 pp.; and Loehman R E et al., "Design of high thermal expansion glass-ceramics through microstructural control," in *Ceramic Microstructures '86 (Materials Sciences Research Volume 21)*, eds. J. A. Pask and A. G. Evans, New York and London: Plenum Press, 1987, pp. 33-43).

High CTE GC and Mismatch to Stainless Steel

One particular lithium silicate GC family, $Li_2O$—$SiO_2$-$Al_2O_3$—$K_2O$—$B_2O_3$—$P_2O_5$—ZnO, is designated as belt processable S-glass (BPS) GC. BPS was developed to obtain high CTE GCs to form matched hermetic seals to high expansion nickel-based and stainless steel (SS) alloys (see, e.g., U.S. Pat. No. 5,820,989). Table 1 shows an exemplary composition of the BPS GC.

TABLE 1

| Exemplary composition of BPS GC | |
|---|---|
| Oxide | BPS GC (wt %) |
| $SiO_2$ | 74.40 |
| $Li_2O$ | 12.65 |
| $Al_2O_3$ | 3.80 |
| $K_2O$ | 2.95 |
| $B_2O_3$ | 1.20 |
| $P_2O_5$ | 3.15 |
| ZnO | 1.85 |

BPS is considered a lithium silicate with additions of small amount other oxides. After heat treatment, the GC contains crystalline phases of nucleant $Li_3PO_4$, LS, cristobalite, and a minor amount of LS2. It also contains a residual glass phase, rich in oxides of potassium, aluminum, zinc, and silicon. Other lithium silicate-based ceramics exist, such as S glass (including $Li_2O$—$SiO_2$—$Al_2O_3$—$K_2O$—$B_2O_3$—$P_2O_5$) and SB glass (similar in composition to the S glass but with lowered boron content).

Careful control of the heat-treatment process, especially the cooling rate from the peak sealing temperatures ~1000° C. to 750° C.-775° C., is necessary to obtain the desired phase assemblage for high CTE GCs. The quantity of cristobalite in the GC determines the upper limit of the CTE since the CTEs of LS and LS2 crystalline phases are in the range 11-13 ppm/° C. Slow cooling allows formation of adequate cristobalite and results in a CTE up to 17 ppm/° C. On the other hand, a higher cooling rate limits the growth and consequently the quantity of cristobalite, resulting in GCs with lower CTEs. The BPS GC thus has a "tunable" CTE, in which the amount of cristobalite can be controlled by the cooling rate from the peak sealing temperature.

Figure 3:
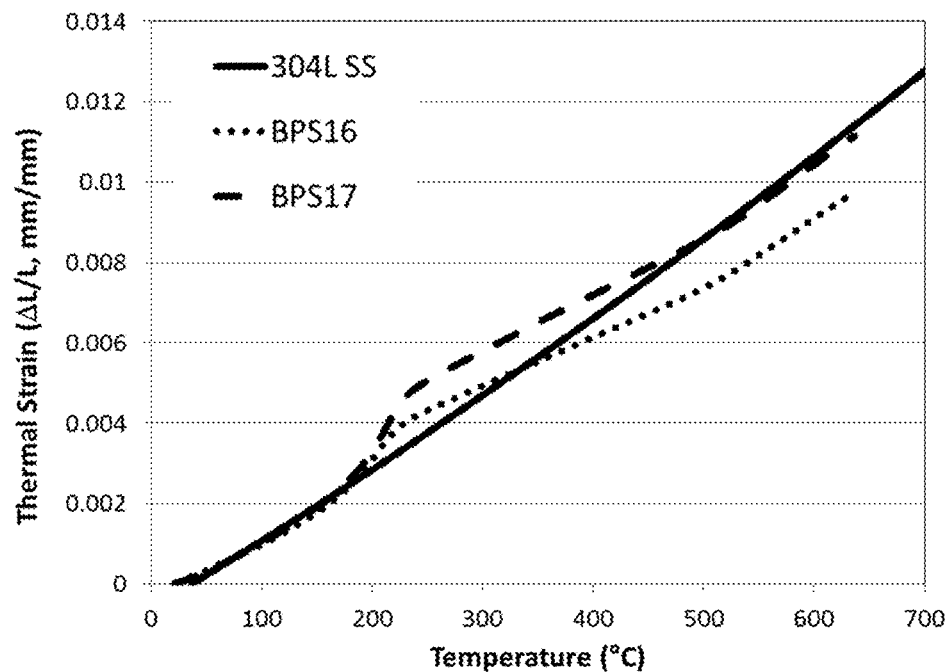
FIG. 3 shows a graph of thermal strain curves for 304L stainless steel and BPS GCs processed to CTE at 16 ppm/° C. and 17 ppm/° C., respectively.

FIG. 3 plots the thermal strain curves of 304L SS and BPS GCs having CTE at 16 ppm/° C. and 17 ppm/° C., designated as SL16 and SL17, respectively, where SL stands for "step-like." For these two SL GCs, the thermal strain had a step-like change near 220° C. This abrupt volume change arises from the known inversion in cristobalite crystallized in the GC. The phase transition induced strain was ~0.002 for SL17 and ~0.0014 for SL16. Such non-linear thermal strains are believed to cause cracking and fracture of stoneware and coatings that contain a large amount of cristobalite (see, e.g., Bauleke M P et al., "How to solve the problems of body cracking and glaze popping in stoneware bodies," *Kansas Geological Survey* 1978 April; bulletin 211(part 4):23-7).

From FIG. 3, it is clear that although the thermal strains of SL17 GC and SS match very well at 40° C. and 600° C. (between which the CTE is calculated), there are significant transient strain mismatches within this temperature range due to the nonlinear strain behavior of the GC. On cooling to a temperature just above the inversion temperature (i.e., 220° C.), the SS shrank faster than GC, and presumably compressed the GC. However, the GC shrank more than the SS from 220° C. to 180° C., where the inversion in cristobalite occurs. The CTE of the SS (18.9 ppm/° C. in the range of 40° C. to 600° C.) was higher than the CTE of SL17, which suggested an overall compression on GC from SS. As such, the dynamic strain mismatch caused by the inversion of cristobalite in GC may generate temporal or transient tensile stress on the GC. If the GC was sealed to SS, then the tensile stress on the GC may cause separation of the GC from the SS at the interface, thereby providing a leaky seal. In addition, these separation gaps may not be re-sealable during further cooling due to interfacial irregularities and relative sliding between the GC and SS along the GC-SS interface. The non-linearity of BPS16 thermal strain was less severe, but the transient mismatch still exists.

Thermal Strain of Silica Polymorphs

Figure 4:
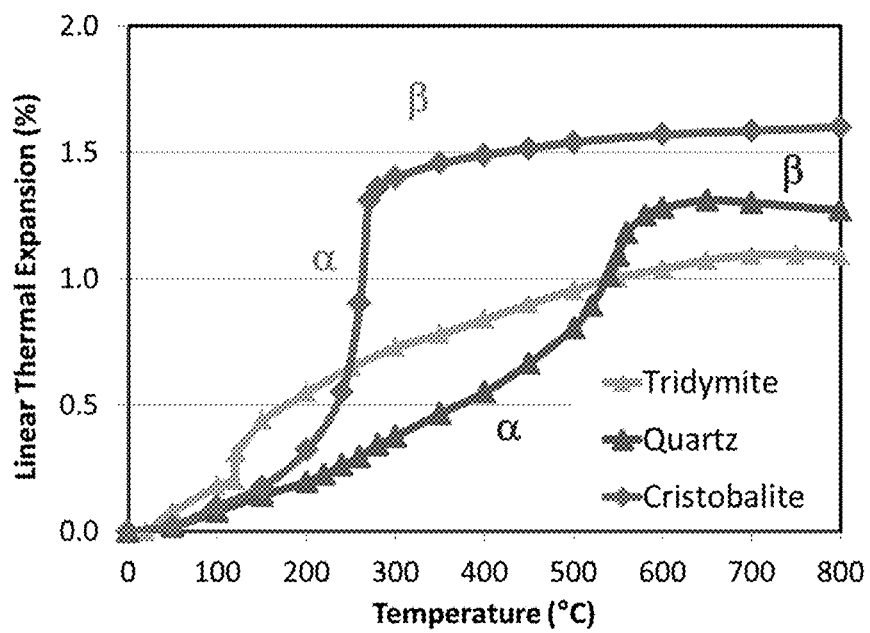
FIG. 4 shows a graph of thermal strain curves showing phase transformation of quartz, cristobalite, and tridymite. Data were adapted from Bauleke M P et al., "How to solve the problems of body cracking and glaze popping in stoneware bodies," Kansas Geological Survey 1978 April; bulletin 211(part 4):23-7.

FIG. 4 shows the thermal strain curves of single crystal cristobalite, quartz, and tridymite. Cristobalite exhibits an inversion temperature of about 273° C. and a corresponding strain of about 0.02. At this inversion temperature, cristobalite is metastable and transitions from a first form (designated α-cristobalite and having a tetragonal crystal symmetry) to a second form (designated β-cristobalite and having a cubic crystal symmetry).

Compared to the single crystal inversion temperature of cristobalite, the inversion temperature in the GC decreased about 50° C. (to around 220° C.), possibly due to clamping from the glass matrix and interaction with other crystalline phases. Also, in the GC, the inversion becomes much more diffuse, as compared to the same phase transition in single crystal cristobalite.

Various transformations are also seen for other silica polymorphs, such as quartz and tridymite (FIG. 4). For quartz, a large volume change is observed, which is induced by quartz inversion at 573° C. At this inversion temperature, quartz transitions from a first form (designated α-quartz and having a trigonal crystal symmetry) to a second form (designated β-quartz and having a hexagonal crystal symmetry). For tridymite, a relatively small volume change occurs at 110° C. At this temperature, tridymite transitions from a first form (designated α-tridymite and having a triclinic crystal symmetry) to a second form (designated β-tridymite and having a hexagonal crystal symmetry). To achieve high CTE GCs the formation of cristobalite and/or quartz is necessary owing to the large inversion induced volume changes in these crystals.

FIG. 5 shows a schematic of these dynamic transformations in $SiO_2$. As can be seen, silica exhibits various polymorphs or phases in a temperature-dependent manner (e.g., quartz, tridymite, cristobalite, and liquid melt). In addition, a particular polymorph can have different forms, such as α- and β-forms. Because the kinetics of the changes between the $SiO_2$ phases is very slow, metastable phases are generally present in real materials and often dominate the behavior. If the nucleation and growth such crystal phases can be controlled, then the resultant GC properties can also be controlled.

For BPS GCs, the main crystallization event occurs during cooling from the peak sealing temperature (e.g., about 900° C.-1000° C.) to a lower temperature (e.g., about 750° C.). As expected from the $SiO_2$ phase diagram, a monotonic decrease in temperature results in precipitation of cristobalite as the dominant high expansion crystalline phases in BPS GC. The growth of cristobalite in this case is a self-limiting process, i.e., crystallization approaches saturation and stops once the available $SiO_2$ in the structure is converted to cristobalite.

As described herein, we describe an approach to reduce the magnitude of the step-like change in thermal strain associated with the inversion in cristobalite, while still maintaining an overall high CTE of GCs. This approach promotes the formation of both quartz and cristobalite in the crystallization process. In this way, the quartz-cristobalite GC could possess a linear thermal strain that combines those strains observed in quartz alone and in cristobalite alone, thereby providing a more linear strain throughout the entire temperature range.

The quartz-cristobalite GC can be formed by any useful process. As seen in FIG. 5, quartz stabilizes at a much lower temperature than that of cristobalite. Thus, in one exemplary process, the heat treatment schedule to crystallize both crystals can include the following: 1) a rapid cooling step from a sealing temperature to an intermediate temperature to quickly pass the initial cristobalite crystallization zone and avoid the growth of cristobalite, as well as avoid the consumption of $SiO_2$ in the cristobalite phase; 2) a heating step from the intermediate temperature to a dwell temperature, such that quartz grows during the heating process; and/or 3) a dwelling step at a temperature for which cristobalite crystallizes over the holding time.

Balancing of the nucleation and growth steps of the crystal polymorphs (e.g., cristobalite and quartz) can be an important consideration to provide beneficial strain properties for the resultant GC. For instance, quartz generally forms at the expense of cristobalite, assuming the total amount of $SiO_2$ available for the crystallization of silica polymorphs is a constant. In fact, the limitation on the supply of $SiO_2$ is evidenced by the highest achievable CTE (17 ppm/° C.-18 ppm/° C.) of BPS GCs with a maximum crystallization of cristobalite. As opposed to GC with a dominant high expansion cristobalite, the coexistence of quartz and cristobalite should produce two smaller step-like changes in thermal strain at the two widely separated inversion temperatures and, thus, improve the linearity of the thermal strain curves.

Experimental Details

Figure 6A:
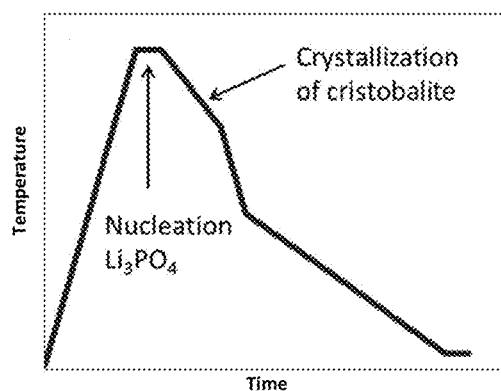
FIG. 6A-6B shows schematics of (A) a prior art sealing profile for growth of cristobalite and (B) a new sealing profile for growth of both quartz and cristobalite.
Figure 6B:
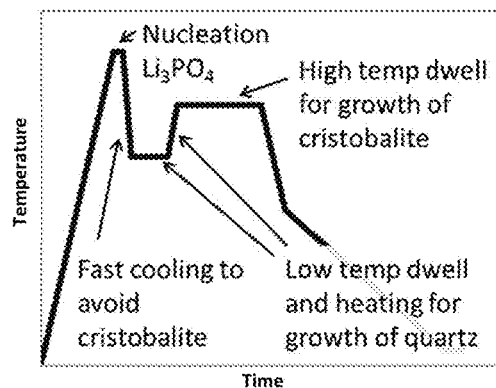
Figure 7:
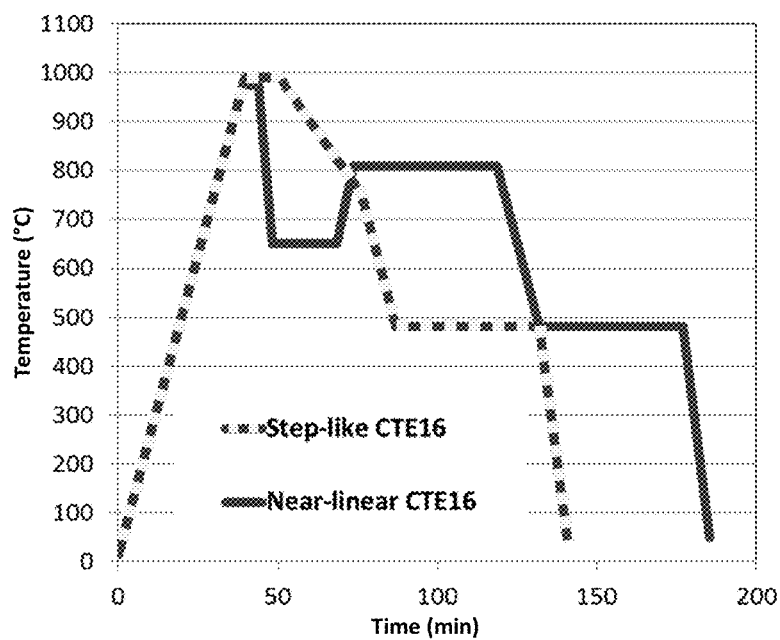
FIG. 7 shows a schematic comparing GC to SS (GCtSS) sealing profiles for SL16 GC (dashed line) and NL16 GC (solid line).

Thermal Treatment Schedule:

FIG. 6A-6B illustrates schematics of the prior art sealing profile, as well as a new sealing profile presented herein, and FIG. 7 compares these two sealing profiles. Common to both profiles is the initial heating step toward the peak sealing temperature, which allows for melting and flowing of the GC preform material into a mold or a cavity, as well as forming of $Li_3PO_4$ nuclei at the peak temperature (see, e.g., Hammetter W F et al., *J. Am. Ceram. Soc.* 1987; 70(8):577-82). Cristobalite $SiO_2$ grows on the nuclei when the glass is cooled slowly (<20° C./min) from the sealing temperature (FIG. 6A). In this prior process, there is hardly any growth of quartz due to a near full consumption of the available $SiO_2$ by the growth of cristobalite.

Table 2 lists actual segments of the existing (SL16) and new profile (NL16) that produce BPS GCs with a same overall CTE of 16 ppm/° C. (40° C.-600° C.). The resultant glass-ceramics were designated as SL16 (step-like) and NL16 (near-linear) GCs. It should be noted that the listed profile is representative and only for crystallization of the GCs. Thermal treatments for other purposes, for example optimization of metal properties, are not included but can be added to the profile in an actual GCtSS sealing schedule.

TABLE 2

Existing (SL16) and new (NL16) sealing profiles GCs at same CTE 16 ppm/° C.

| SL16 | | | NL16 | | |
| --- | --- | --- | --- | --- | --- |
| Temperature (° C.) | Rate (° C./min.) | Dwell (min.) | Temperature (° C.) | Rate (° C./min.) | Dwell (min.) |
| 15 | | | 15 | | |
| 990 | 25 | | 975 | 25 | |
| 990 | | 10 | 975 | | 5 |
| 750 | 10.5 | | 650 | 75 | |

TABLE 2-continued

Existing (SL16) and new (NL16) sealing profiles GCs at same CTE 16 ppm/° C.

| SL16 | | | NL16 | | |
|---|---|---|---|---|---|
| Temperature (° C.) | Rate (° C./min.) | Dwell (min.) | Temperature (° C.) | Rate (° C./min.) | Dwell (min.) |
| 750 | | 0 | 650 | | 20 |
| 482 | 25 | | 810 | 30 | |
| 482 | | 45 | 810 | | 45 |
| 50 | 5 | | 482 | 25 | |
| 50 | | 10 | 482 | | 45 |
| 15 | | | 50 | 5 | |
| | | | 50 | | 10 |
| | | | 15 | | |

One particular step in the new sealing profile (FIG. 6B) is the rapid cooling (e.g., a cooling rate ≥50° C./min.) from the peak sealing temperature to 650° C. The rapid cooling step inhibits growth of cristobalite. Heating from 650° C. to 810° C. is designed to preferentially crystallize quartz. In addition, the dwell period at 810° C. is designed to promote growth of cristobalite after the formation of quartz.

Preparation of Quenched GC Samples and Thermal Strain Measurement:

Partially sintered CTE bars, at 49.9×3.9×3.9 mm, fabricated from pressed powder were supplied by the GC vendors and used to prepare GC samples for thermal strain measurement. The bars were placed inside 3.9 mm wide slots in graphite fixtures for heat treatment in flowing nitrogen atmosphere. The heat treated samples were then cut to 1 inch long samples for CTE measurement using the Netzsch DIL 402 dilatometer. Manufacturer provided 1 inch long platinum and alumina rods were used as a calibration standard. The measurement profile includes heating and cooling cycles at a rate 3° C./min. from room temperature to 670° C. CTE of GC samples is typically calculated in the temperature range from 40° C. to 600° C.

Figure 8:
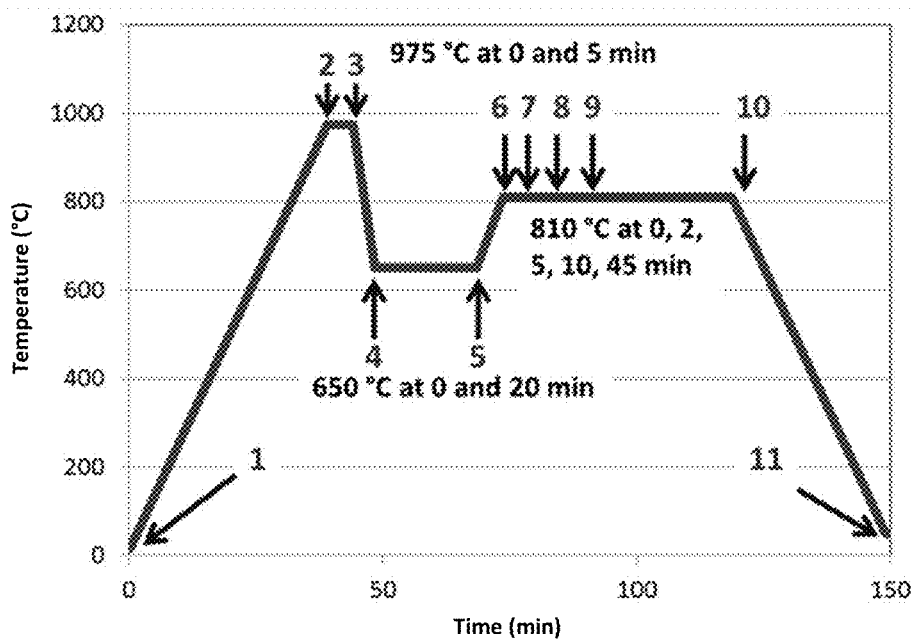
FIG. 8 shows eleven temperature-time points for quenched GCs.

Quenched GC samples were obtained by turning off the furnace power at selected temperatures and times in the NL16 sealing cycle, as shown in FIG. 8. The actual cooling rate from each quench point to room temperature is >50° C./min. A total of nine samples (i.e., samples #2 to #10) were quenched from the NL16 sealing cycle. Sample #1 represented the starting sintered GC pressed powder preform, and sample #11 was the actual NL16 GC.

XRD Quantitative Phase Analysis:

XRD analysis was performed using a Bruker D2 Phaser system equipped with a sealed tube X-ray source (Cu radiation) and a Lynx-Eye position sensitive detector. The system is a q-q geometry, permitting the sample to remain stationary during data collection. Sample rotation was not employed. A 0.6° incident beam divergence slit was employed, as well as a knife edge (3 mm opening above the sample) at the sample to reduce parasitic noise to the detector. The generator was operated at 30 kV and 10 mA. The Lynx-Eye detector also employed a Ni-filter to reduce $K_\beta$ radiation. Data were collected over a 2θ range of 10°-80° with a step size of 0.02° and a scan rate of 0.01°/sec. for an effective point detector count time of ~19 sec. per step. These data were of sufficient quality for Rietveld refinement.

Conventional Rietveld refinement (via Topas v. 2.1, Bruker-AXS, 2010) of the room temperature XRD data can be applied to obtain the quantitative weight fraction of quartz and cristobalite, and the balance lithium silicates and $Li_3PO_4$ crystalline phases. In addition, Rietveld analysis yields structural information, such as lattice parameters and cell volumes for the observed crystalline phases. However, these quantitative values account only for the crystalline portion of the specimen and do not yield proportionalities for the amorphous content in the sample.

A method to determine the quantitative weight percentage of the amorphous content in GCs from powder XRD data was developed. To model the amorphous content, an additional phase of cristobalite was added to the refinement having very small (0.9 nm) crystallite size. This additional nanocrystalline cristobalite phase had its lattice parameters fixed to the expected values of those of tetragonal cristobalite (a ~4.972 Å, c~6.922 Å), thereby constraining the glass density to be approximately identical to that of crystalline cristobalite phase (i.e., ~2.3 g/cm$^3$). This additional phase mimics, to first-order, the amorphous hump present in the powder data. This fit was not ideal, and improvements could be made to obtain better quantitative analyses. However, this model served to capture the relative changes of the fraction of glass present in the GCs at different stages of processing.

Results and Discussion

Figure 9:
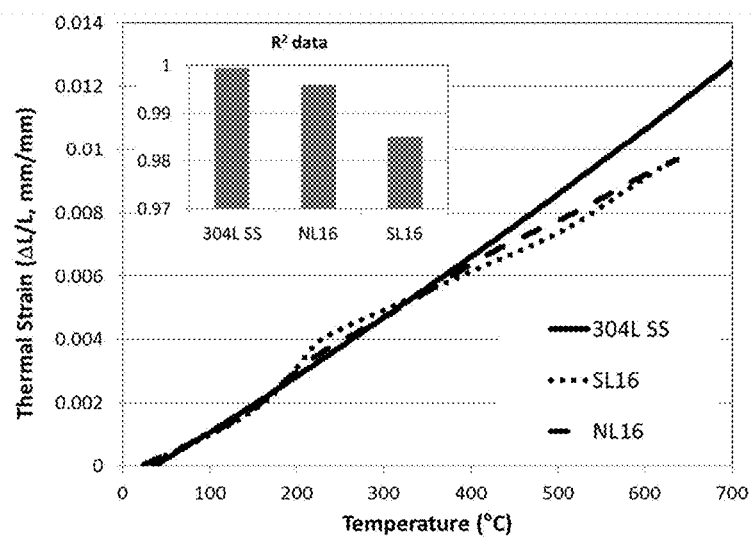
FIG. 9 shows thermal strain curves of 304L SS, SL16 and NL16 GCs. The inset shows the corresponding $R^2$ data.

Near Linear GC with Coexistence of Cristobalite and Quartz:

FIG. 9 shows thermal strains of 304L SS, SL16 and NL16 GCs. Comparing to SL16 GC showing a step change in thermal strain at 220° C., the NL16 GC shows a much reduced step at the same temperature, as well as a diffused second step around 470° C. The second broad step in NL16 is believed to be induced by the inversion in quartz. For quartz grown from a glass, the inversion temperature appears significantly reduced from the 573° C. inversion temperature in single crystal quartz. Also, the volume change occurs over a much wider temperature range, losing the character of a sharp 1st order transition of the single crystal. Lowering of the quartz inversion temperature by lithia or the combination of lithia and alumina has been discussed in the literature (see, e.g., Hummel F A, "Thermal expansion properties of some synthetic lithia minerals," *J. Am. Ceram. Soc.* 1951 August; 34(8):235-9).

The linearity of the thermals strain curves in FIG. 9 can be represented by the $R^2$ value from linear regression analysis, where $R^2=1$ represents a perfect linear strain-temperature curve. The inset in FIG. 9 shows $R^2$ data for the correspondent materials. It is evident that the linearity of NL16 GC increased significantly from that of SL16 GC. In GCtSS sealing, the NL16 GC would match much better to 304L SS with minimum thermal mismatch, as seen in SL16 GC.

Figure 10:
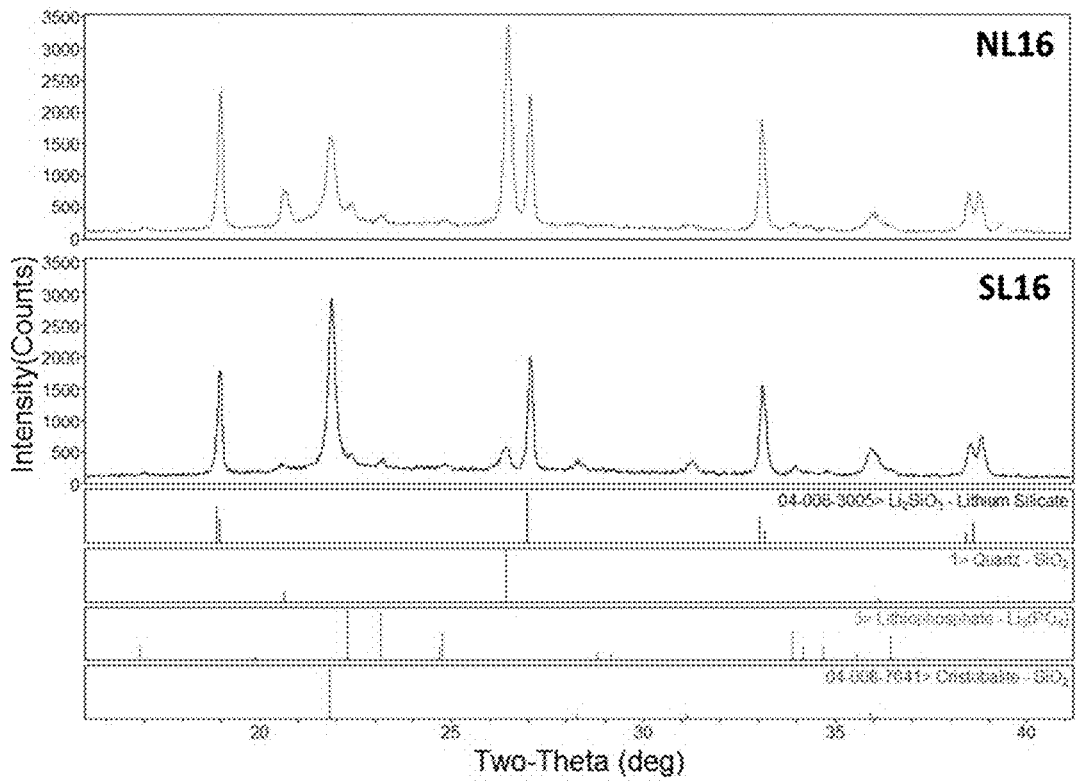
FIG. 10 shows XRD patterns of SL16 and NL16 GCs.

FIG. 10 shows XRD patterns of SL16 and NL16 GCs. The LS and $Li_3PO_4$ crystalline phases exist in both GCs. The SL16 has a dominant cristobalite peak with a presence of small amount of quartz. On the other hand, the NL16 showed significantly reduced cristobalite peaks and significantly larger intensity for the quartz peaks. The XRD study provides direct and unambiguous evidence of the coexistence of quartz and cristobalite in the NL16 GC.

Table 3 shows the weight percentage of crystalline and amorphous phases in SL16 and NL16 GCs. Data indicate significant differences between SL16 and NL16 GCs with considerable differences between the cristobalite, quartz, and amorphous phase fractions. At 24.4 wt %, the cristobalite is the dominant $SiO_2$ phase in SL16 GC in which the low quartz is at a minor 2.5 wt %. For NL16 GC, the cristobalite fraction decreased to 16.6 wt %, while the low quartz fraction increased to 13.7 wt %. The weight fractions of the $Li_2SiO_3$ and $Li_3PO_4$ phases remained in similar quantities in the two GCS. It also appeared that SL16 has a higher fraction of the amorphous phase, likely from the shorter duration at the crystallization temperatures comparing to that of NL16 GC.

TABLE 3

Weight percentage of amorphous and crystalline phases in SL16 and NL16 GCs from quantitative XRD analysis

| Phase | SL16 wt % | ±wt % | NL16 wt % | ±wt % |
|---|---|---|---|---|
| Quartz Low $SiO_2$ | 2.5 | 0.1 | 13.7 | 0.2 |
| Cristobalite $SiO_2$ | 24.4 | 0.3 | 16.6 | 0.3 |
| $Li_2SiO_3$ | 36.8 | 0.5 | 37.9 | 0.4 |
| $Li_3PO_4$ | 7.9 | 0.5 | 7.4 | 0.4 |
| Amorphous | 28.4 | 0.6 | 24.4 | 0.6 |

Figure 11:
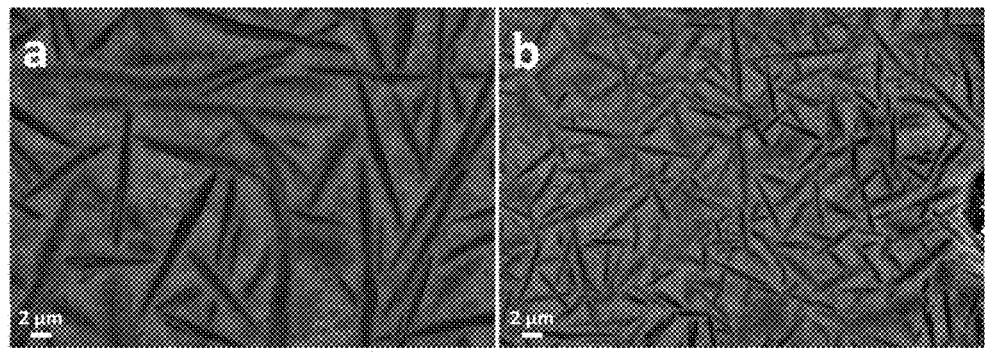
FIG. 11 shows SEM images of (a) SL16 GC and (b) NL16 GC.

Distinct difference in microstructure between SL16 and NL16 GCs was observed by SEM analysis, as shown in FIG. 11. The SL16 GC had a much coarser structure with needle shaped $Li_2SiO_3$ crystals approaching a length of about 10 µm-20 µm. The cristobalite crystals, at a size of a few formed clusters between the long $Li_2SiO_3$ crystals. The shape of the clusters varied significantly, from stream-like particles disposed alongside needle $Li_2SiO_3$ crystals, as well as to triangles or rectangles confined by the $Li_2SiO_3$ crystals. The size of these clusters was around 10 µm-20 µm. High Z-contrast Zn-rich phases inside the clusters of cristobalite were also seen. Micro cracks were also observed throughout the SL GCs. The microstructure of SL16 GC is similar to that observed in BPS17 GC.

On the other hand, the NL16 composition had a much finer and more homogeneous microstructure with $Li_2SiO_3$ crystals at about 2 µm to 5 µm long. The size of cristobalite and quartz was around a few similar to those in SL16. A major difference is the lack of clustering of the cristobalite and/or quartz; as the cristobalite and quartz forms in NL16 were distributed much more evenly between the interconnected $Li_2SiO_3$ crystals. Indeed, there was no existence of micro cracks in NL16.

The different microstructures of SL16 and NL16 may directly affect local stresses at the GC-SS interface. There is a possibility for localized temporal tension on the SL16 GC as large clusters of cristobalite crystals shrink away from the interface upon cooling and during the α-β phase transformation. The same shrinkage of the cristobalite clusters may cause microcracks in the bulk GC. Without wishing to be limited by mechanism, the reduced volume of cristobalite in the NL16 GC, as well as the near absence of cristobalite clusters, may greatly reduce the likelihood of localized tension in this GC. We believe that the coexistence of quartz may distribute the compression on GC more evenly when the GCtSS seal is cooled. Additional studies on the effects of microstructure and chemistry on the GC-SS interfacial stresses can be conducted (e.g., using any useful methodology, such as those described herein).

Phase Sequence in NL16 GC:

Quenched GC samples were obtained by turning off the power to furnace at selected temperatures and times in the NL16 sealing cycle, as shown in FIG. 8. The actual cooling rate from each point to room temperature was more than about 50° C./min. A total of nine samples (i.e., sample #2 to #10) were quenched from the NL16 sealing cycle. Sample #1 represented the starting sintered GC pressed powder preform (PPP), and sample #11 was the actual NL16 GC.

Figure 12:
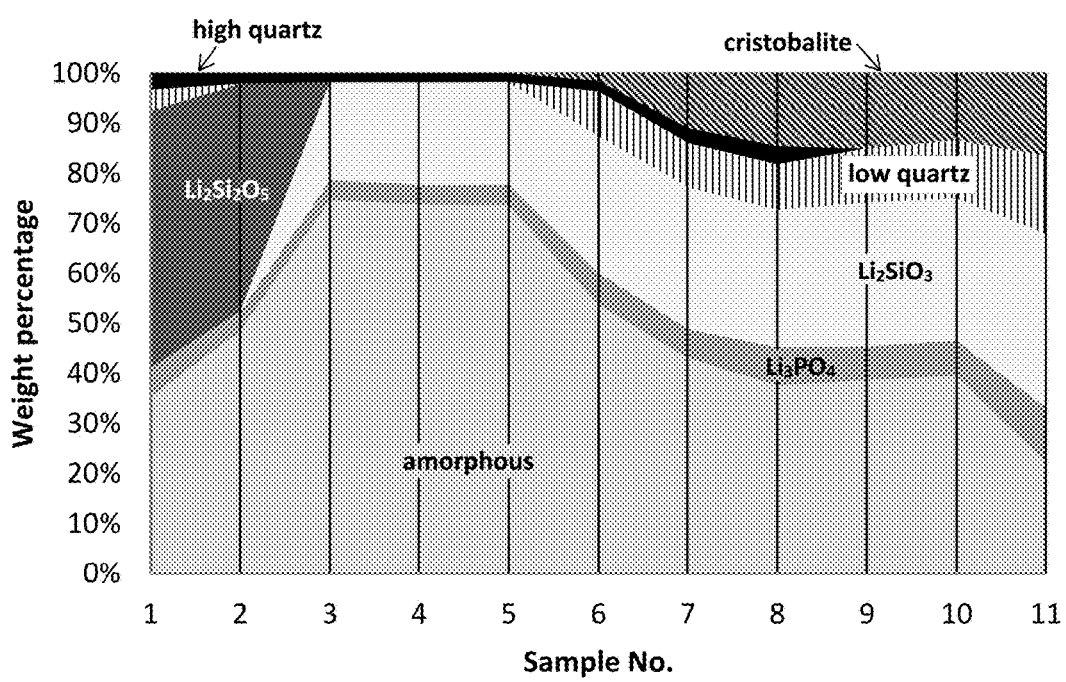
FIG. 12 shows a graph of the weight percentage of crystalline and amorphous phases in quenched GC samples (sample #1 to #11).

FIG. 12 summarizes the compositions of quench samples from quantitative XRD analysis. The weight percentage of the glass phase was calculated based on an assumed density of crystalline cristobalite phase with formula $SiO_2$ (but smaller crystallite size at 9 nm). Thus, the reported values may be an overestimation of glassy phase, as the glass will likely be lower in density. The error should be systematic, so comparison between samples should still be valid.

As can be seen, FIG. 12 shows the progression of the heat treatment schedule and its effect on crystalline composition of the GC. Initially, the sample includes major amounts of an amorphous phase and lithium silicate ($LiSi_2O_3$). As the heat treatment schedule progresses, the sample converts lithium silicate ($LiSi_2O_3$) to lithium disilicate ($LiSi_2O_5$) upon reacting with $SiO_2$ in the melt (see, e.g., sample #2 versus #3). As can be seen, cristobalite is absent in the initial samples, as desired in the current heat treatment schedule. Rather, quartz is preferentially crystallized prior to cristobalite, thereby ensuring that cristobalite formation does not inhibit the nucleation and growth of the quartz phase (see, e.g., sample #6, which contains more quartz than cristobalite, as measured by weight percentage). Then, cristobalite is preferentially grown (see, e.g., sample #6-#8, showing increasing amounts of cristobalite), thereby providing a GC having comparable amounts of cristobalite and quartz (see, e.g., sample #11).

Overall, the proposed heat treatment schedule provides the desired GC with proper amounts of the cristobalite and quartz phases in order to provide a near linear strain characteristic. Without wishing to be limited by mechanism, the sequence of phase formation in NL16 GCs can be summarized in the following steps (1) to (9):

(1) The initial GC sample (sample #1) has over 50 wt % of $Li_2Si_2O_5$ with minor low quartz, high quartz and nucleation agent $Li_3PO_4$. These crystalline phases are formed from the pre-sintering of the GC pressed powder preforms (PPP). It should be noted the $Li_3PO_4$ nuclei could form prior to the melting of the GC during the sintering of the GC PPPs, as opposed to the suggestion that the nuclei form and grow at the peak sealing temperature (see, e.g., Headley T J et al., J. Am. Ceram. Soc. 1984; 67(9):620-5). When the PPPs were heated to 1000° C. (sample #2), the low quartz phase disappeared, and $Li_2Si_2O_5$ was still the dominant crystalline phase.

(2) Between samples #2 and #3, $Li_2Si_2O_5$ was converted to a $Li_2SiO_3$ phase after the GC was held at 1000° C. for about 10 minutes. High quartz was present in a small quantity until sample #9.

(3) The phase fractions remained stable during the 1000° C. to 650° C. cooling period, as well as during the dwell period at 650° C. (samples #3 to #5). There was no indication of quartz formation after the sample was held for 20 minutes at 650° C.

(4) Low quartz grew when the GC was heated from 650° C. to 810° C. (samples #5 to #6). The low quartz fraction appeared to be quite stable during the remainder of the dwell period at 810° C. (samples #6 to #10). The 650° C. to 810° C. ramp up period contributed to the formation of quartz (e.g., compare sample #5 at 650° C. with sample #6 at 810° C., showing increased amounts of low quartz). Further optimization of low quartz formation might be realized, e.g., by controlling the thermal profile of this heating period (e.g., by optimizing temperature $T_2$ and $T_3$, and/or optimizing rate $r_3$, as shown in FIG. 2A-2B and described herein).

(5) The bulk of the cristobalite appeared to grow during the initial two minute dwell period at 810° C. (samples #6 to #7), after a small amount of cristobalite formed during the 650° C. to 810° C. ramp up period (sample #5 to #6). This large increase in cristobalite coincided with a significant drop in the amorphous phase, suggesting that cristobalite formed from the glass phase and not at the expense of other crystalline phases.

(6) The fraction of cristobalite continued to increase beyond the two minute mark at 810° C. (samples #7 to #10) but at a much slower rate. It is not clear whether the growth of cristobalite at this stage is at the expense of the glass.

(7) The reason for the existence of high quartz throughout samples #1 to #8 and the sudden disappearance in sample #9 remains unresolved. The slight growth of cristobalite in sample #9 might be at the expense of both the high quartz and the glass phase. However, more investigation can be conducted (e.g., using any methodology, such as those described herein), especially in regard to this hypothetical crystal conversion during the dwelling period at 810° C.

(8) $Li_3PO_4$ looks to be relatively constant during the thermal process, with perhaps a lower concentration in samples #3 to #5. These data are meant to show trends, and the errors on the phase fractions can sometimes exceed 5%, due to the small amount of the phase.

(9) There does appear to be a considerable decrease in the amount of the amorphous phase between sample #10 and #11 (the final NL16). Without wishing to be limited by mechanism, it appears that all the crystalline phases increase at the expense of the glass.

Figure 13:
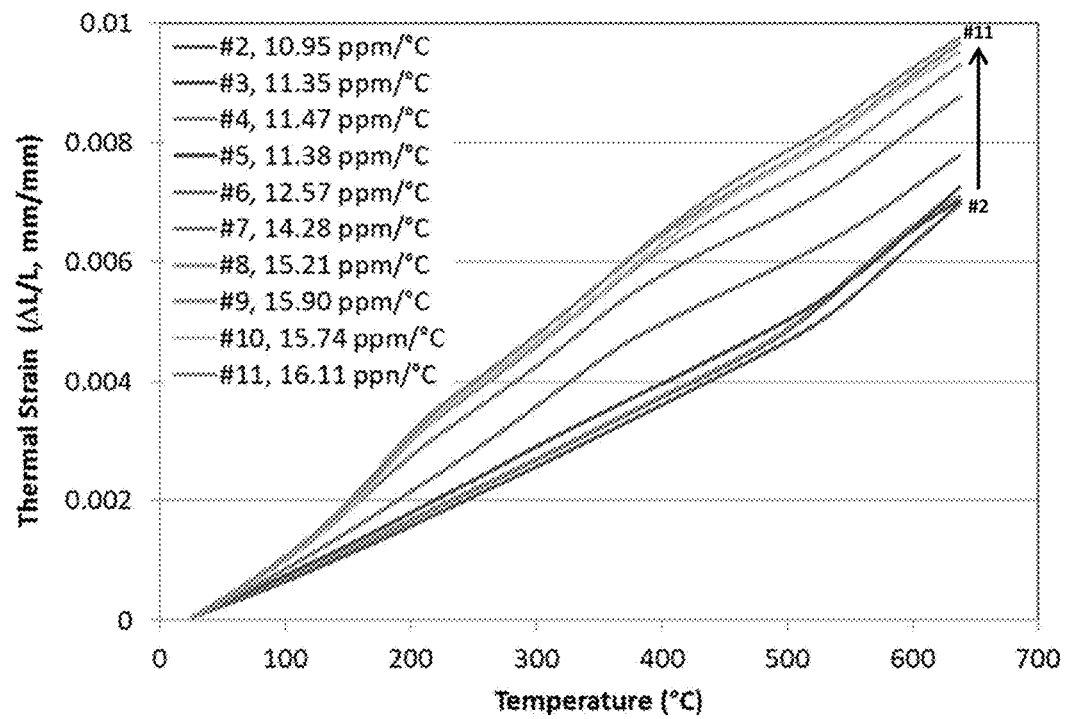
FIG. 13 shows a graph of thermal strain and CTE data for quenched NL16 GC samples (sample #2 to #11).

Thermal Strain of Quenched Samples:

The thermal strains, from the heating measurement, and the corresponding CTE data (40° C. to 600° C.) of samples #2 to #11 are shown in FIG. 13. For samples #2 to #5, the strain curves appeared to be similar, and the measured CTE values varied slightly and only within a narrow range. The great increase in CTE for sample #6 was accompanied by a broad peak in the thermal strain at about 375° C., presumably a volume change induced by the quartz inversion. There is little indication of the presence of cristobalite, so nearly all of the CTE increase in sample #6 can be attributed to the formation of quartz.

Likewise, the increase in CTE of sample #7 can be attributed to the formation of cristobalite, as evidenced by the broad peak near 220° C., which is typically induced by the cristobalite inversion. As the weight percentage of cristobalite continues to grow beyond sample #7 during the dwell period at 810° C., the thermal strain associated with the inversion increased accordingly. This increase in the presence of cristobalite also likely contributed to the higher CTE oserved in sample #9. The high CTE achieved in sample #11 (NL16 GC) is consistent with the XRD quantitative analysis; the amount of amorphous phase decreased between sample #10 and the final NL16. In addition, it appears that all the crystalline phases, including cristobalite and quartz, increased at the expense of the glass during the final cooling stage.

CONCLUSION

The high expansion cristobalite phase dominated the crystallization in the existing sealing profile, where the GC was subject to a monotonic cooling from the sealing temperature.

Following the phase diagram of silica, crystalline quartz could be formed in the existing GCs using the new sealing profile. One particular step included quenching the glass after exposure to the sealing temperature (e.g., temperature $T_1$ in FIG. 2A) to avoid an initial formation of cristobalite, followed by the forming of quartz on the way up to a higher temperature (e.g., on the way up to temperature $T_3$ in FIG. 2A), and the crystallization of cristobalite during the dwell period thereafter (e.g., period $P_3$ in FIG. 2A). The coexistence of quartz and cristobalite significantly improved the linearity of the thermal strain of the GC.

Example 2: GC Preforms for Use in Hermetic Seals

The GC compositions herein can be employed in any useful purpose. In one use, the GC composition is formed into a preform, which is then inserted into a cavity in which a hermetic seal is to be formed. Then, the preform is heated to a sealing temperature (e.g., temperature $T_1$ in FIG. 2A) and then processed according to any thermal process that produced a near linear strain GC (e.g., any thermal process described herein). This example provides non-limiting embodiments of preforms and their use.

Figure 14A:
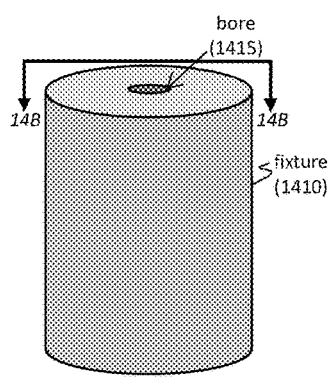
FIG. 14A-14B shows a schematic of an exemplary GC seal between a GC 1425 and a pin 1420.
Figure 14B:
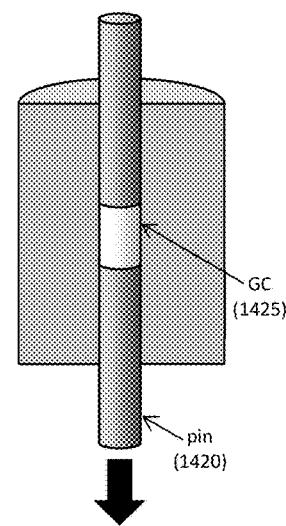

The GC composition herein is particular useful for forming hermetic seals to metals (e.g., stainless steel, as well as other metals described herein). The formation of GC seals can be tested in any useful manner. For instance, FIG. 14A-14B provides a schematic for a fixture 1410 including a bore 1415 through which a metal pin 1420 and a GC preform can be inserted. A seal can be formed between two metal pins 1420 and the GC material 1425, and the strength of this seal can be tested by pulling on the pin (black downward arrow in FIG. 14B).

Figures 15A, 15B:
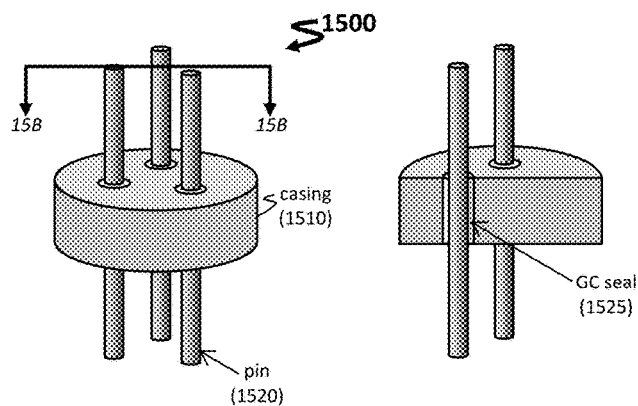
FIG. 15A-15B shows schematics of a connector 1500 having an exemplary GC seal 1525 between a casing 1510 and a plurality of pins 1520.

In one embodiment, the GC-to-metal seal includes a hermetic seal with a plurality of pins. As seen in FIG. 15A, the connector 1500 includes a plurality of pins 1520 (e.g., metal pins) disposed within a casing 1510 (e.g., a metal casing). A hermetic GC seal 1525 is formed between each pin and a cavity within the casing (FIG. 15B). The GC seal can include any useful GC composition described herein.

Figures 16A, 16B:
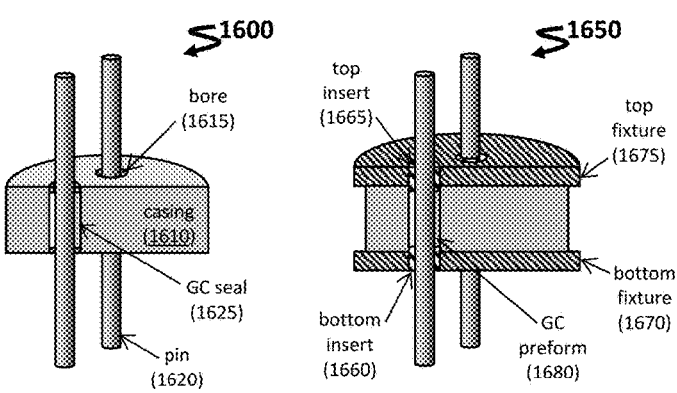
FIG. 16A-16B shows schematics of (A) another connector 1600 having an exemplary GC seal 1625 between a casing 1610 and a plurality of pins 1620 and (B) an exemplary assembly 1650 to facilitate seal formation.

The GC composition can extend along the entire bore of the casing or within only a portion of the bore. As seen in FIG. 16A, the connector 1600 includes a plurality of pins 1620 (e.g., metal pins) disposed within a casing 1610 (e.g., a metal casing), in which a GC seal 1625 is provided within each bore 1615.

The connector can be formed in any useful way. Generally, a solid GC preform is placed within a cavity or bore requiring the GC seal. Then, the preform is treated to a high temperature sufficient to melt the preform, such that the melted GC composition fills the cavity and forms a hermetic seal. During this melting step, the flow of the GC composition should be controlled (e.g., by employing fixtures and/or inserts). Finally, thermal processes are conducted to crystallize particular polymorphs and solidify the seal. For instance, as seen in FIG. 16B, an assembly 1650 can be employed to control the melting and sealing process. The solid GC preform 1680 is placed within each bore of the casing 1610 in which a seal is desired. To ensure that the GC composition remains within the bore during the melting step (or sealing step at temperature $T_1$, as employed herein), a top insert 1665 and a bottom insert 1660 is placed on each end of the bore. The assembly 1650 also includes a top fixture 1675 located on a top surface of the casing 1610, as well as a bottom fixture 1670 located on a bottom surface of the casing 1610. Each of these fixtures includes recesses that align with each pin 1620 and insert 1660,1665. After sealing, the fixtures and inserts can be removed to provide the connector 1600.

Figure 17:
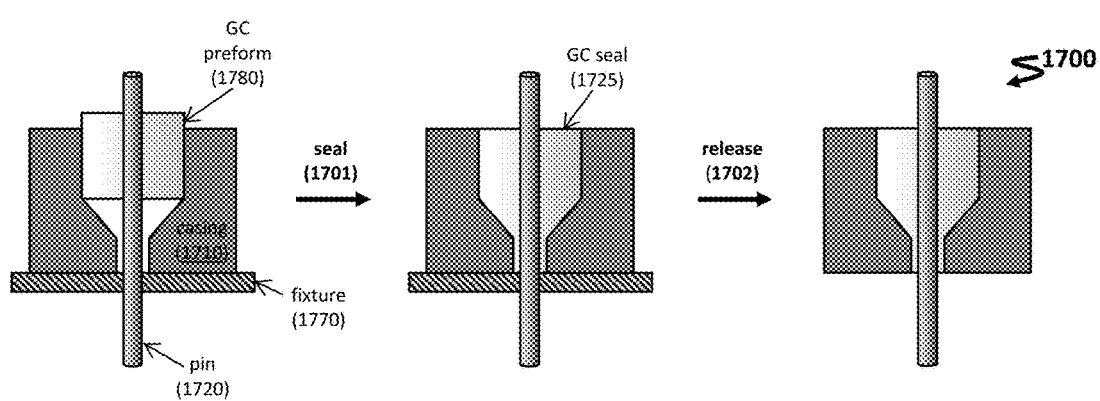
FIG. 17 shows a schematic for an exemplary method of forming a connector 1700.

In another embodiment, the GC seal is formed by employing a molded casing. As seen in FIG. 17, the casing 1710 includes a molded cavity into which a GC preform 1780 is placed. The casing also allows for placement and alignment of a pin 1720. To ensure that the GC composition remains within the molded cavity, a fixture 1770 can be employed. Then, sealing 1701 occurs by heating the assembly to a first temperature $T_1$ sufficient to melt the GC preform. After a thermal treatment schedule (e.g., as seen in FIG. 2A, 2B, 7, or 8), the assembly is released 1702 to form the connector 1700.

Figure 18A:
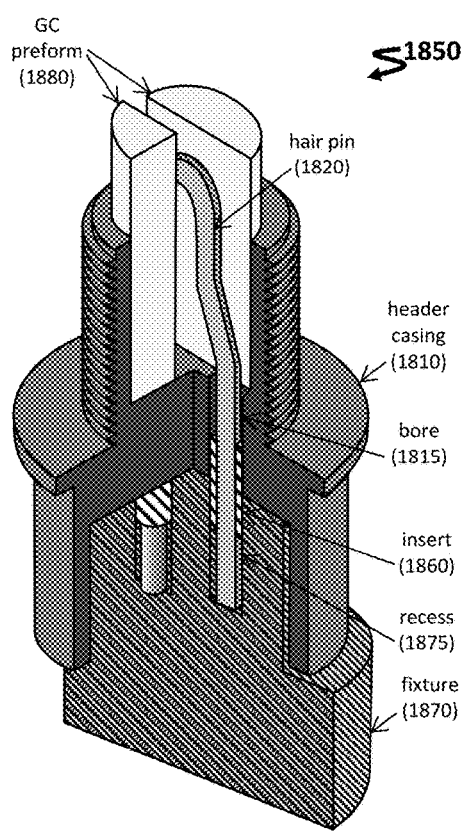
FIG. 18A-18B shows schematics for an exemplary assembly 1850 to form an electrical header 1800.
Figure 18B:
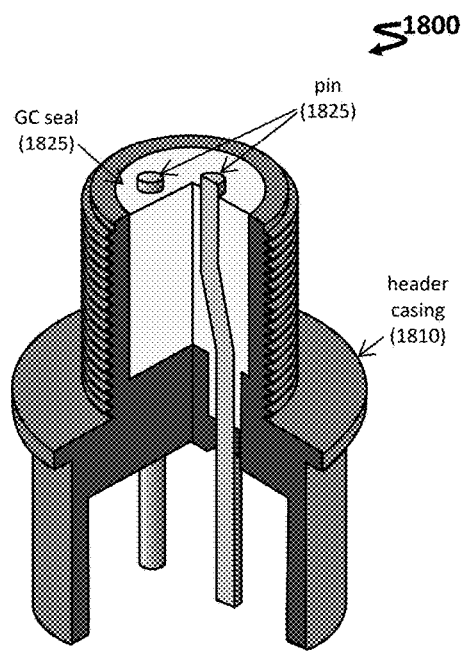

Any useful connector can be employed. In one instance, the connector can be an electrical header. FIG. 18A-18B shows an exemplary assembly 1850 to form an electrical header 1800. The assembly 1850 includes a hair pin 1820 disposed within a cavity of the header casing 1810 and inserted through bores 1815 located within the cavity. In addition, a removable fixture 1870 with aligned recesses 1875 are employed during sealing, and inserts 1860 are placed within the bores 1815 to maintain the GC composition within the bores. The GC preform 1880 is placed within the cavity of the header casing 1810, and the two preforms sandwich the U-shaped portion of the hair pin 1820.

The GC seal 1825 is formed (e.g., using any thermal treatment described herein), and then the fixture 1870 and inserts 1860 are removed from the assembly. In addition, the hair pin 1820 is ground to form two pins 1825 that are properly spaced and sealed within the header 1800. Additional inspecting and testing steps, as well as electropolishing and cleaning steps, can be performed on the final header.

Other Embodiments

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A method comprising:
providing a glass-ceramic mixture configured to provide a glass-ceramic composition comprising of from about 65 wt. % to about 80 wt. % of $SiO_2$; from about 8 wt. % to about 16 wt. % of $Li_2O$; from about 2 wt. % to about 8 wt. % of $Al_2O_3$; from about 1 wt. % to about 8 wt. % of $K_2O$; from about 1 wt. % to about 5 wt. % of $P_2O_5$; from about 0.5 wt. % to about 7 wt. % of $B_2O_3$; and from about 0.1 wt. % to about 5 wt. % of ZnO;
heating the mixture to a first temperature $T_1$ of from about 950° C. to about 1050° C.;
rapidly cooling at a rate $r_2$ greater than about 30° C./minute to a second temperature $T_2$ of from about 400° C. to about 750° C., thereby minimizing formation of a cristobalite $SiO_2$ phase within the mixture;
reheating the mixture to a third temperature $T_3$ of from about 750° C. to about 850° C., thereby facilitating formation of a quartz $SiO_2$ phase within the mixture; and
cooling the mixture to a fourth temperature $T_4$ of from about 10° C. to about 500° C., thereby forming a glass-ceramic composition.

2. The method of claim 1, wherein the rate $r_2$ is of from about 40° C./minute to about 80° C./minute.

3. The method of claim 1, further comprising dwelling at the first temperature $T_1$ for a first period $P_1$ configured to allow the mixture to flow and fill a cavity.

4. The method of claim 3, wherein the first period $P_1$ is of from about 1 minute to about 30 minutes.

5. The method of claim 1, further comprising dwelling at the second temperature $T_2$ for a second period $P_2$ configured to facilitate formation of the quartz $SiO_2$ phase.

6. The method of claim 5, wherein the second period $P_2$ is of from about 1 minute to about 60 minutes.

7. The method of claim 1, further comprising dwelling at the third temperature $T_3$ for a third period $P_3$ configured to facilitate formation of the cristobalite $SiO_2$ phase.

8. The method of claim 7, wherein the third period $P_3$ is of from about 1 minute to about 60 minutes.

9. The method of claim 1, wherein the glass-ceramic composition comprises of from about 5 wt. % to about 30 wt. % of $SiO_2$ as a cristobalite phase and about 5 wt. % to about 30 wt. % of $SiO_2$ as a quartz phase.

10. The method of claim 9, wherein the ratio, by weight, of the cristobalite phase to the quartz phase is of from about 1:0.5 to about 1:2.

11. The method of claim 1, wherein the glass-ceramic composition comprises a glass-ceramic preform or a glass-ceramic seal.

12. The method of claim 1, wherein the heating step is conducted in the presence of a metal.

13. The method of claim 12, wherein the glass-ceramic composition forms a seal with the metal.

14. The method of claim 13, wherein the seal is a hermetic seal comprising:
a metal component; and
a glass-ceramic composition disposed on a surface of the metal component, the composition comprising:
from about 65 wt. % to about 80 wt. % of $SiO_2$;
from about 8 wt. % to about 16 wt. % of $Li_2O$;
from about 2 wt. % to about 8 wt. % of $Al_2O_3$;
from about 1 wt. % to about 8 wt. % of $K_2O$;
from about 1 wt. % to about 5 wt. % of $P_2O_5$;
from about 0.5 wt. % to about 7 wt. % of $B_2O_3$; and
from about 0.1 wt. % to about 5 wt. % of ZnO;
wherein the composition further comprises of from about 5 wt. % to about 30 wt. % of $SiO_2$ as a cristobalite phase and about 5 wt. % to about 30 wt. % of $SiO_2$ as a quartz phase.

15. The method of claim 1, wherein the glass-ceramic composition comprises:
from about 65 wt. % to about 80 wt. % of $SiO_2$;
from about 8 wt. % to about 16 wt. % of $Li_2O$;
from about 2 wt. % to about 8 wt. % of $Al_2O_3$;
from about 1 wt. % to about 8 wt. % of $K_2O$;
from about 1 wt. % to about 5 wt. % of $P_2O_5$;
from about 0.5 wt. % to about 7 wt. % of $B_2O_3$; and
from about 0.1 wt. % to about 5 wt. % of ZnO;
wherein the composition further comprises of from about 5 wt. % to about 30 wt. % of $SiO_2$ as a cristobalite phase and about 5 wt. % to about 30 wt. % of $SiO_2$ as a quartz phase.

16. The method of claim 15, wherein the ratio, by weight, of the cristobalite phase to the quartz phase is of from about 1:0.5 to about 1:2.

17. The method of claim 16, wherein the quartz phase comprises α-quartz and/or β-quartz.

18. The method of claim 16, wherein the cristobalite phase comprises α-cristobalite and/or β-cristobalite.

19. The method of claim 15, wherein a combined weight percentage for both the cristobalite phase and the quartz phase is of from about 20 wt. % to about 40 wt. %.

20. The method of claim 19, further comprising of from about 5 wt. % to about 30 wt. % of $SiO_2$ as an amorphous phase.

* * * * *